(12) United States Patent
Gupta et al.

(10) Patent No.: US 8,842,612 B2
(45) Date of Patent: Sep. 23, 2014

(54) METHODS AND APPARATUS FOR SERVICE ACQUISITION IN A MULTI-FREQUENCY NETWORK

(75) Inventors: Binita Gupta, San Diego, CA (US); Linbo Li, San Diego, CA (US); Raghuraman Krishnamoorthi, San Diego, CA (US); Ashok Mantravadi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1485 days.

(21) Appl. No.: 12/141,840

(22) Filed: Jun. 18, 2008

(65) Prior Publication Data

US 2009/0029705 A1 Jan. 29, 2009

Related U.S. Application Data

(60) Provisional application No. 60/945,268, filed on Jun. 20, 2007.

(51) Int. Cl.
*H04W 48/18* (2009.01)
*H04J 1/16* (2006.01)

(52) U.S. Cl.
CPC .................................. *H04W 48/18* (2013.01)
USPC ............ 370/329; 370/252; 370/331; 370/430

(58) Field of Classification Search
CPC .................................................. H04W 48/18
USPC ................... 370/252, 329, 331, 430
See application file for complete search history.

(56) References Cited

U.S. PATENT DOCUMENTS 5,724,647 A * 3/1998 Sato ........................... 455/552.1
5,896,572 A * 4/1999 Scotton ....................... 455/452.1
6,011,960 A * 1/2000 Yamada et al. ................ 455/77

(Continued)

FOREIGN PATENT DOCUMENTS

JP 2000512100 A 9/2000
JP 2007005976 A 1/2007

(Continued)

OTHER PUBLICATIONS

International Preliminary Report on Patentability, PCT/US2008/067788, International Preliminary Examining Authority, European Patent Office, Sep. 22, 2009.

(Continued)

*Primary Examiner* — John Pezzlo
(74) *Attorney, Agent, or Firm* — The Marbury Law Group, PLLC

(57) ABSTRACT

Methods and apparatus for service acquisition in a multi-frequency network. In an aspect, a method is provided for service acquisition in a multi-frequency network. The method includes detecting a service acquisition trigger event and identifying a selected RF channel from an acquisition RF list based on signal strength, wherein the acquisition RF list identifies RF channels in one or more local operations infrastructures (LOIs) of the multi-frequency network. The method also includes acquiring a wide system on the selected RF channel, removing the selected RF channel from the acquisition RF list if the wide system can not be acquired on the selected RF channel, and repeating said operations of identifying, acquiring and removing until the wide system is acquired on the selected RF channel or a system acquisition timeout occurs.

65 Claims, 16 Drawing Sheets

(56) References Cited

U.S. PATENT DOCUMENTS

| | | | | |
|---|---|---|---|---|
| 6,411,806 | B1* | 6/2002 | Garner et al. | 455/428 |
| 8,457,064 | B2* | 6/2013 | Gupta et al. | 370/331 |
| 2003/0207696 | A1 | 11/2003 | Willenegger et al. | |
| 2004/0063427 | A1* | 4/2004 | Narasimha et al. | 455/434 |
| 2005/0063339 | A1* | 3/2005 | Jeong et al. | 370/331 |
| 2006/0203837 | A1* | 9/2006 | Shvodian | 370/445 |
| 2007/0026827 | A1* | 2/2007 | Miyano et al. | 455/132 |
| 2007/0153719 | A1* | 7/2007 | Gopal | 370/328 |
| 2007/0242783 | A1* | 10/2007 | Nishi | 375/344 |
| 2008/0040509 | A1* | 2/2008 | Werb et al. | 709/242 |

FOREIGN PATENT DOCUMENTS

| | | | |
|---|---|---|---|
| JP | 2007509590 | A | 4/2007 |
| JP | 2008537395 | A | 9/2008 |
| JP | 4699513 | | 3/2011 |
| KR | 20050013451 | A | 2/2005 |
| WO | 99/67972 | | 12/1999 |
| WO | 2005/011157 | | 2/2005 |
| WO | 2005/043829 | | 5/2005 |
| WO | 2006/099222 | | 9/2006 |
| WO | WO2006110445 | A1 | 10/2006 |
| WO | 2008/116197 | | 9/2008 |
| WO | WO2009099876 | | 8/2009 |

OTHER PUBLICATIONS

International Search Report, PCT/US2008/067788, International Searching Authority, Dec. 29, 2008, European Patent Office.

Written Opinion, PCT/US2008/067788, International Searching Authority, Dec. 29, 2008, European Patent Office.

Maeda S., "4-5. Multichannel Broadcast Service for Cellular Phones: MediaFLO," Journal of the Institute of Image Information and Television Engineers, Japan, May 1, 2006, vol. 60, No. 5, pp. 725-727.

* cited by examiner

METHODS AND APPARATUS FOR SERVICE ACQUISITION IN A MULTI-FREQUENCY NETWORK

CLAIM OF PRIORITY UNDER 35 U.S.C. §119

The present application for patent claims priority to Provisional Application No. 60/945,268 entitled "Power-Up FLO Service Acquisition for a Multiple Frequency Network Feature," filed Jun. 20, 2007, and assigned to the assignee hereof and hereby expressly incorporated by reference herein.

BACKGROUND

1. Field

The present application relates generally to the operation of data networks, and more particularly, to methods and apparatus for service acquisition in a multi-frequency network.

2. Background

Data networks, such as wireless communication networks, have to trade off between services customized for a single terminal and services provided to a large number of terminals. For example, the distribution of multimedia content to a large number of resource limited portable devices (subscribers) is a complicated problem. Therefore, it is important for network operators, content retailers, and service providers to have a way to distribute content and/or other network services in a fast and efficient manner and in such a way as to increase bandwidth utilization and power efficiency.

A multi-frequency network (MFN) is a network in which multiple radio frequencies (RFs) (or RF channels) are used to transmit media content. One type of MFN is a horizontal multi-frequency network (HMFN) where a distribution waveform is transmitted over different RF channels in different local areas. The same or different content may be transmitted as part of distribution waveform carried over different RF channels in such local areas. Another type of MFN is a vertical multi-frequency network (MFN) in which multiple radio frequency (RF) channels are used in a given local area to transmit independent distribution waveforms with an aim to increase the capacity of the network (in terms of the ability to deliver more content to a device/end user). An MFN deployment may also consist of VMFN in certain areas and HMFN in certain other areas.

In a typical HMFN, a local operations infrastructure (LOI) comprises transmitting sites that operate to transmit a single distribution waveform over an RF channel in a selected geographic area. In a typical VMFN, a local operations infrastructure (LOI) comprises transmitting sites that operate to transmit multiple distribution waveforms over multiple RF channels in a selected geographic area. Each distribution waveform may comprise one or more content flows that can be selected at a receiving device for rendering. Adjacent LOIs may utilize the same or different RF channels.

During operation, a receiving device needs to acquire network service in the multi-frequency network in order to receive desired content. For example, the receiving device acquires network service at power up or after a loss of service occurs. A loss of service may occur when the device moves from one region to another region of the multi-frequency network. Acquiring network service typically involves acquiring lower layer overhead information from the multi-frequency network. Since in a multi-frequency network it is possible for the receiving device to acquire service through one of a plurality of available RFs, selection of the RF for service acquisition impacts quality and how fast network service is acquired.

Therefore, it is desirable to have a service acquisition mechanism that operates to allow a device to acquire service in a multi-frequency network in a fast and efficient manner.

SUMMARY

In one or more aspects, a network service acquisition system, comprising methods and apparatus, is provided that operates to allow a device to acquire network service in a multi-frequency network. For example, at power up or after a loss of service has occurred, the network service acquisition system determines a selected RF channel in the multi-frequency network through which service is acquired. In an aspect, the network service acquisition system operates to consider a plurality of factors, including but not limited to, signal strength and overhead information availability to determine the selected RF channel. Once the RF channel is determined, the device can acquire network service in the multi-frequency network in a fast and efficient manner.

In an aspect, a method is provided for service acquisition in a multi-frequency network. The method comprises detecting a service acquisition trigger event and identifying a selected RF channel from an acquisition RF list based on signal strength, wherein the acquisition RF list identifies RF channels in one or more LOIs of the multi-frequency network. The method also comprises acquiring a wide system on the selected RF channel, removing the selected RF channel from the acquisition RF list if the wide system can not be acquired on the selected RF channel, and repeating the operations of identifying, acquiring and removing until the wide system is acquired on the selected RF channel or a system acquisition timeout occurs.

In an aspect, an apparatus is provided for service acquisition in a multi-frequency network. The apparatus comprises processing logic configured to detect a service acquisition trigger event and identify a selected RF channel from an acquisition RF list based on signal strength, wherein the acquisition RF list identifies RF channels in one or more LOIs of the multi-frequency network. The processing logic is also configured to acquire a wide system on the selected RF channel, remove the selected RF channel from the acquisition RF list if the wide system can not be acquired on the selected RF channel, and repeat the operations of identifying, acquiring and removing until the wide system is acquired on the selected RF channel or a system acquisition timeout occurs.

In an aspect, an apparatus is provided for service acquisition in a multi-frequency network. The apparatus comprises means for detecting a service acquisition trigger event, and means for identifying a selected RF channel from an acquisition RF list based on signal strength, wherein the acquisition RF list identifies RF channels in one or more LOIs of the multi-frequency network. The apparatus also comprises means for acquiring a wide system on the selected RF channel, means for removing the selected RF channel from the acquisition RF list if the wide system can not be acquired on the selected RF channel, and means for repeating the operations of identifying, acquiring and removing until the wide system is acquired on the selected RF channel or a system acquisition timeout occurs.

In an aspect, a computer program product is provided for service acquisition in a multi-frequency network. The computer program product comprises a machine-readable medium that comprises a first set of codes for causing a computer to detect a service acquisition trigger event and a second set of codes for causing the computer to identify a selected RF channel from an acquisition RF list based on signal strength, wherein the acquisition RF list identifies RF channels in one or more LOIs of the multi-frequency network. The machine-readable medium also comprises a third set of codes for causing the computer to acquire a wide system on the selected RF channel, a fourth set of codes for causing the computer to remove the selected RF channel from the acquisition RF list if the wide system can not be acquired on the selected RF channel, and a fifth set of codes for causing the computer to repeat the operations of identifying, acquiring and removing until the wide system is acquired on the selected RF channel or a system acquisition timeout occurs.

In an aspect, at least one integrated circuit is provided that is configured for service acquisition in a multi-frequency network. The at least one integrated circuit comprises a first module configured to detect a service acquisition trigger event and a second module configured to identify a selected RF channel from an acquisition RF list based on signal strength, wherein the acquisition RF list identifies RF channels in one or more LOIs of the multi-frequency network. The at least one integrated circuit also comprises a third module configured to acquire a wide system on the selected RF channel, a fourth module configured to remove the selected RF channel from the acquisition RF list if the wide system can not be acquired on the selected RF channel, and a fifth module configured to repeat the operations of identifying, acquiring, and removing until the wide system is acquired on the selected RF channel or a system acquisition timeout occurs.

In an aspect, a method is provided for service acquisition in a multi-frequency network. The method comprises detecting a control channel acquisition trigger event, acquiring a control channel on a last best RF channel, and removing the last best RF channel from a control channel handoff RF list if the control channel is not acquired on the last best RF channel for a pre-determined number of acquisition attempts. The method also comprises initiating a control channel handoff procedure if the control channel is not acquired on the last best RF channel, and repeating the operations of acquiring, removing, and initiating until the control channel is acquired or a control channel acquisition timeout occurs.

In an aspect, an apparatus is provided for service acquisition in a multi-frequency network. The apparatus comprises means for detecting a control channel acquisition trigger event, means for acquiring a control channel on a last best RF channel, and means for removing the last best RF channel from a control channel handoff RF list if the control channel is not acquired on the last best RF channel for a pre-determined number of acquisition attempts. The apparatus also comprises means for initiating a control channel handoff procedure if the control channel is not acquired on the last best RF channel, and means for repeating the operations of acquiring, removing, and initiating until the control channel is acquired or a control channel acquisition timeout occurs.

In an aspect, a method is provided for service acquisition in a multi-frequency network. The method comprises acquiring wide and local system on a current RF channel, determining that signal strength of the current RF channel is below a selected threshold if the wide and local system are acquired, and monitoring RF channels in a neighbor RF list to measure their associated signal strength. The method also comprises switching to a selected RF channel from the neighbor RF list having the strongest signal strength if the selected RF channel is different than the current RF channel, and acquiring the wide and local system on the selected RF channel.

In an aspect, an apparatus is provided for service acquisition in a multi-frequency network. The apparatus comprises processing logic configured to acquire wide and local system on a current RF channel, determine that signal strength of the current RF channel is below a selected threshold if the wide and local system are acquired, and monitor RF channels in a neighbor RF list to measure their associated signal strength. The processing logic is also configured to switch to a selected RF channel from the neighbor RF list having the strongest signal strength if the selected RF channel is different than the current RF channel and acquire the wide and local system on the selected RF channel.

Other aspects will become apparent after review of the hereinafter set forth Brief Description of the Drawings, Description, and the Claims.

BRIEF DESCRIPTION OF THE DRAWINGS

The foregoing aspects described herein will become more readily apparent by reference to the following Description when taken in conjunction with the accompanying drawings wherein.

DESCRIPTION

Figure 1:
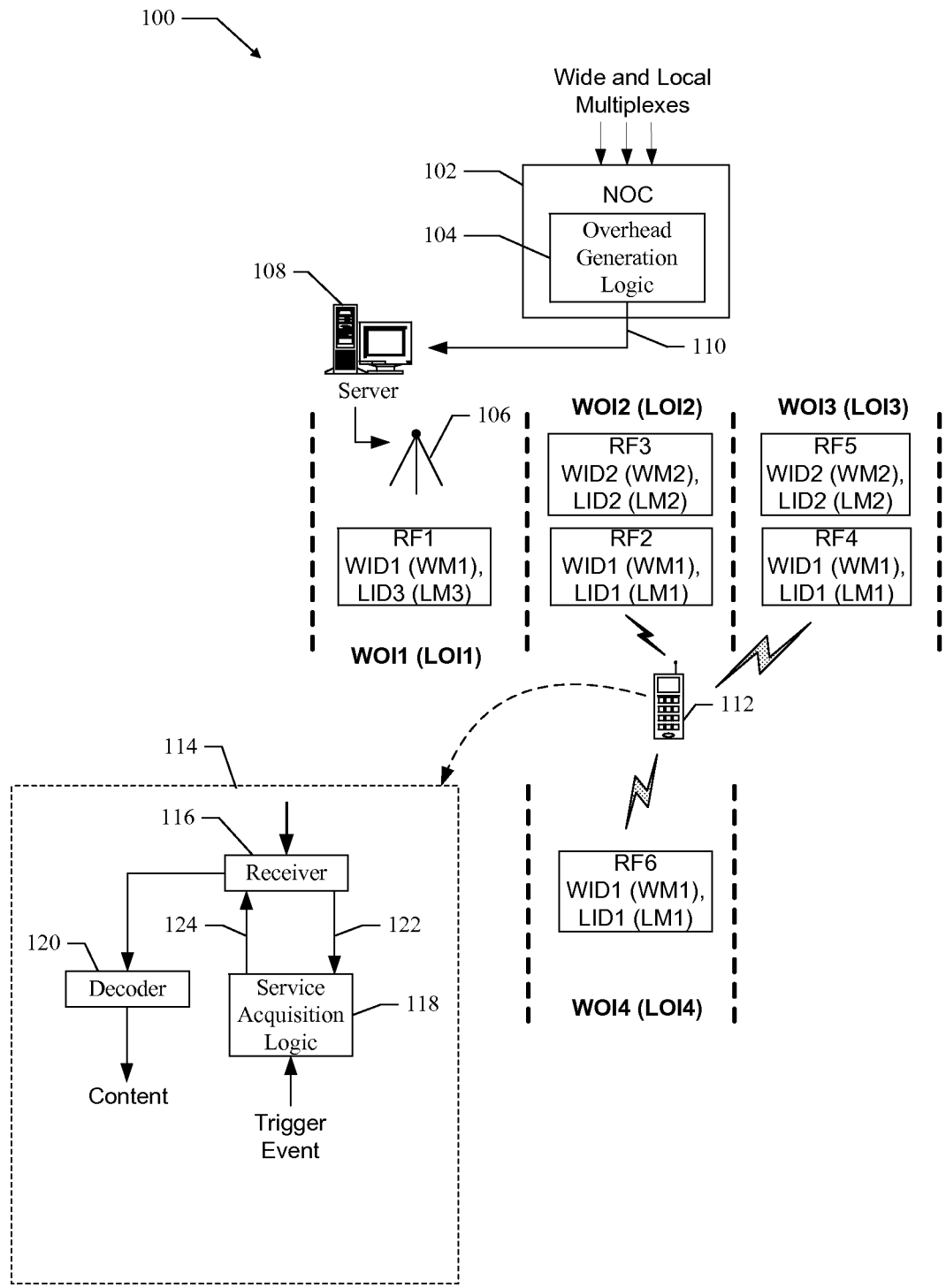
FIG. 1 shows a network that illustrates the operation of aspects of a service acquisition system for use in multi-frequency network.

In one or more aspects, a network service acquisition system, comprising methods and apparatus, is provided that operates to allow a device to acquire service in a multi-frequency network. For simplicity the network service acquisition system is also referred to herein as a "service acquisition system" or "acquisition system." In an aspect, service acquisition involves acquiring lower layer overhead information from the multi-frequency network. The lower layer overhead information is used to receive media content for content flows requested by applications or end users. For example, service acquisition includes acquiring overhead information symbols (OIS) and control channel (CC) information. The CC is used to map content flows to the associated RF channel carrying those flows. The OIS is used to determine the location of Media Logical Channel (MLCs) carrying content flows in a distribution waveform.

In an aspect, the service acquisition system operates to acquire service in response to one or more trigger events. For example, a trigger event may be a power-up condition or a loss of the network service. Based on the trigger event, the service acquisition system determines a selected RF channel in the multi-frequency network over which network service can be acquired in a fast and efficient manner. If network service can not be acquired on the selected RF channel, the service acquisition system operates to determine another suitable RF channel to acquire the network service efficiently. The service acquisition system operates to consider signal strength of RF channels when selecting an RF channel for acquiring the network service.

The system is well suited for use in wireless network environments, but may be used in any type of network environment, including but not limited to, communication networks, public networks, such as the Internet, private networks, such as virtual private networks (VPN), local area networks, wide area networks, long haul networks, or any other type of data network.

Definitions

The following definitions are used herein to describe aspects of a network service acquisition system.
1. Local Area—Refers to a local geographic area such as a building, group of buildings, community, city, county or other local region in which services may be broadcast.
2. Wide Area—Refers to a wide geographic area such as a county, state, multiple states, country, multiple countries or other wide region in which services may be broadcast.
3. Multiplex—Refers to a grouping of content flows.
4. Wide Area Multiplex—Refers to a grouping of content flows that are broadcasted over at least one wide area.
5. Local Area Multiplex—Refers to grouping of content flows that are broadcasted over at least one local area.
6. Wide Area Operations Infrastructure (WOI)—Refers to a grouping of transmitters and associated systems that operate to transmit content flows over a wide area. A WOI maps to the smallest geographical wide area which can carry a wide area multiplex. A wide area multiplex may be broadcasted over one or more WOIs.
7. Local Area Operations Infrastructure (LOI)—Refers to a grouping of transmitters and associated systems that operate to transmit content flows over a local area. A LOI maps to the smallest geographical local area which can carry a local area multiplex. A local area multiplex may be broadcasted over one or more LOs.
8. RF Channel—Refers to an RF frequency that is used to convey a content distribution waveform over a selected LOI.
9. Content Channel—Refers to selected content flows within a particular distribution waveform. For example, a distribution waveform may comprise multiple content channels and each content channel may comprise one or more content flows.

Acronyms

The following acronyms are used herein to describe aspects of a network service acquisition system.
LM—Local Area Multiplex
WM—Wide Area Multiplex
NOC—Network Operations Center
WOI—Wide Area Operations Infrastructure
LOI—Local Area Operations Infrastructure
NDM—Neighbor Description Message
WID—Wide Area Descrambling Identifier
LID—Local Area Descrambling Identifier
OIS—Overhead Information Symbols
CC—Control Channel
WOIS—Wide OIS
LOIS—Local OIS FIG. 1 shows a network 100 that illustrates the operation of aspects of a service acquisition system for use in multi-frequency network. For example, the network 100 comprises four WOIs (WOI1, WOI2, WOI3, and WOI4) each comprising one LOI (LOI1, LOI2, LOI3, and LOI4, respectively) of a multi-frequency network. Within each LOI, one or more RF channels are used to transmit wide and local content. LOI2 and LOI3 have a vertical MFN with two RF channels in each of these LOs. LOI1 and LOI4 carry only one RF channel. Each RF channel has an associated WID/LID that identifies descrambling sequences that can be used to descramble content transmitted on that RF channel. LOI1, LOI2, LOI3, and LOI4 are neighboring LOIs as shown in the network 100. The LOI1 has LOI2 as its neighbor, the LOI2 has LOI1, LOI3 and LOI4 as its neighbors, the LOI3 has LOI2 as its neighbor and LOI4 has LOI2 as its neighbor.

The network 100 comprises a network operations center (NOC) 102 that operates to receive wide and local content multiplexes for distribution over selected wide and local areas of a multi-frequency network. The NOC 102 also operates to configure the multi-frequency network to distribute that content. To accomplish this, the NOC 102 is aware of the geographic regions of the network that are covered by the LOs, the RF channels used in each region, the neighboring LOIs of each LOI and any other network information that may be needed to configure the network and distribute the network overhead information and the wide and local area content multiplexes. It should be noted that the network 100 may comprise any number of LOs.

In an aspect, the NOC 102 comprises overhead generation logic 104. The overhead generation logic 104 operates to assemble overhead information related to RF channels, neighboring LOIs and service flows. The overhead generation logic 104 operates to assemble information relating to the list of neighboring LOIs for each LOI, the list of RF channels providing service in each of those LOIs and the WID/LID descrambling identifiers that are associated with the RF channels in each LOI. In an aspect, the overhead generation logic 104 operates to generate neighbor description messages (NDMs) that are configured to provide a list of neighboring LOIs associated with a particular LOI, the list of RF channels providing service in the particular LOI and its neighboring LOIs and WID/LID identifiers that identify descrambling sequences associated with RF channels in each of those LOs. In another aspect, the NDM messages are configured to provide a list of neighboring LOs, a list of RF channels in each of those LOIs and WID/LID identifiers associated with those RF channels for any selected group of LOs. The WID/LID information from NDM message is used to descramble content when decoding content flows. A more detailed description of the NDM messages generated by the neighbor description logic 104 is provided in another section of this document.

In an aspect, the overhead generation logic 104 operates to assemble control information related to service flows. For example, in an aspect the overhead generation logic 104 operates to generate an overhead information message providing a mapping of content flows to RF channels carrying those flows in the multi-frequency network.

The NOC 102 operates to transmit the wide and local area multiplexes and the generated overhead information messages (including NDMs) to the LOIs in the network 100. It should be noted that although only four LOIs are shown, the NOC 102 may transmit the multiplexes and associated NDMs to any number of LOs.

In an aspect, the LOI1, LOI2, LOI3, and LOI4 comprise one or more transmitter sites. For example, the LOI1 comprises transmitter site 106. Each transmitter site operates to transmit a distribution waveform on a selected RF channel over its respective LOI. It should be noted that each transmitter site comprises one or more servers as illustrated at 108.

In an aspect, the NOC 102 operates to transmit the content multiplexes and the generated overhead information (including NDMs) to the transmitter sites using any suitable transport mechanism. For example, the content multiplexes and overhead information are transmitted to servers associated with each transmitter site, as illustrated at 110. In an aspect, the NOC 102 transmits the content multiplexes and overhead information to the transmitter sites using an MPEG-2 transport mechanism. In this configuration, the multiplexes and overhead information messages are assigned MPEG-2 transport identifiers so that servers at each transmitter site can detect and receive selected content multiplexes and overhead information messages which are directed to them, respectively.

The servers at the transmitter sites use the transport identifiers to determine which multiplexes and NDM message are intended for them to distribute over their respective LOs. The servers then operate to pack their respective multiplexes and the NDM message into transmission frames for transmission over selected RF channels. The servers utilize any suitable physical layer process to pack the multiplexes and the NDM message into the transmission frames for transmission. By using the transport identifiers to determine the multiplexes and overhead information messages (including NDMs) intended for transmission over their respective LOs, the servers at the transmitter sites need not decode any of the multiplexes or overhead information messages. The servers simply detect the appropriate transport identifiers and then pack the identified multiplexes and the overhead information message into the transmission frames according to the physical layer process.

The transmission frames comprise overhead information symbols, content flows, and control channels which convey overhead information messages such as the NDM message generated by the overhead generation logic 104. In an aspect, the transmission frames comprise wide and local data partitions that are used to convey the wide and local area content flows, respectively. In addition, the wide and local partitions comprise wide and local control channels. In an aspect, the local control channel is used to distribute the NDM message generated by the overhead generation logic 104 to the devices in each LOI. In an aspect, the wide control channel is used to distribute a mapping of content flows to associated RF channels for wide content flows. In another aspect, the local control channel is used to distribute a mapping of content flows to associated RF channels for local content flows.

In an aspect, the transmitter sites transmit transmission frames over their respective LOIs using the designated RF channels. By using multiple RF channels in LOIs for transmitting transmission frames, the network 100 is able to transmit more content flows over such LOs. It should be noted that the transmitter sites within a LOI may be co-located or separated by any desired distance. It should also be noted that the NDMs distributed over each LOI may be different because each LOI may have a different set of neighbor LOIs and each neighbor LOI may be associated with different RF channels and associated descrambling sequences with which to descramble the transmitted content.

Within each LOI, descrambling sequence identifiers are associated with each RF channel. The descrambling sequence identifiers comprise wide area descrambling sequence identifiers (WID) and local area descrambling sequence identifiers (LID). The descrambling sequence identifiers identify descrambling sequences that can be used to descramble content received in a particular LOI on a particular RF channel. The descrambling sequence identifiers also identify content multiplexes carried on a particular RF channel. For example, in LOI2 there are two RF channels (i.e., RF2, RF3) and each RF channel is associated with descrambling sequence identifiers that identify descrambling sequences that can be used to descramble associated wide area and local area content multiplexes. For example, RF2 is associated with WID1 and LID1 and carries wide multiplex WM1 and local multiplex LM1; and RF3 is associated with WID2 and LID2 and carries wide multiplex WM2 and local multiplex LM2. WID1, LID1, WID2 and LID2 identify multiplexes WM1, LM1, WM2 and LM2 respectively.

A device 112 is shown operating in the LOI2. The device 112 may be pre-programmed with operational information during manufacture, sale, registration, or at any other suitable time. The pre-programmed information includes a pre-programmed (PP) RF list, which identifies RFs the device 112 may use to establish network services. The device 112 may also receive information that identifies additional neighboring RFs which may be used to establish network services.

It will be assumed that the device 112 is tuned to receive wide area content on channel RF2 that can be descrambled with a descrambling sequence identified by WID1. Details of the device 112 are shown at 114. The device 112 comprises a receiver 116 that operates to tune to a selected RF channel to receive transmission frames. For example, the receiver 116 is tuned to RF2 in LOI2 to receive transmission frames. The receiver 116 descrambles the received content contained in the transmission frames using the correct WID/LID identifiers associated with RF2 in LOI2 and passes the descrambled content to a decoder 120 that operates to render the content for the device user.

The transmission frames comprise a local control channel that conveys neighbor description information in one or more NDMs. For example, the NDMs are generated by the overhead generation logic 104 and distributed to the LOIs shown in FIG. 1. In an aspect, an NDM comprises the list of neighboring LOIs for a device's current LOI (i.e. LOI2 for device 112), a list of RF channels carried in device's current LOI (i.e. LOI2) and its neighboring LOIs (i.e. LOI1, LOI3 and LOI4) and WID/LID descrambling identifiers associated with RF channels in these LOs.

The receiver 116 passes network status and neighbor description information received in an NDM (or the NDM itself) to service acquisition logic 118, as illustrated at 122. The service acquisition logic 118 also operates to receive one or more trigger events. A trigger event indicates to the service acquisition logic 118 that network service needs to be acquired. At power-up or after any other trigger event, the service acquisition logic 118 operates to determine a selected RF channel through which service is to be acquired. For example, the service acquisition logic 118 controls the receiver 116, as illustrated at 124, to acquire network service using the selected RF.

To acquire service in a multi-frequency network, a device acquires timing signals on the current RF comprising pilots symbols (referred to herein as TDM1 and TDM2), wide and local information channel symbols (referred to herein as WIC, LIC), and overhead information symbols (OIS) associated with the wide and local system.

Thus, to acquire network service, aspects of the service acquisition logic 118 operates to perform one or more of the following functions.
1. Detect when network service needs to be acquired (i.e., in response to power-up, loss of service, or other trigger event)
2. Determine from a pre-programmed RF list or from received neighbor description information a list of available RF channels through which service may be acquired.
3. Execute a service acquisition algorithm to select an RF channel through which service can be acquired.
4. Attempt to acquire network service (i.e., timing signals) on the selected RF channel.
5. If the service can not be acquired on the selected RF channel, continue to execute steps 3 and 4 above to select another suitable RF channel to acquire network service until a service acquisition timer expires.

Therefore, in various aspects, the service acquisition system operates to determine which of the available RF channels in a multi-frequency network is to be selected so that service acquisition can be performed in a fast and efficient manner.

Figure 2:
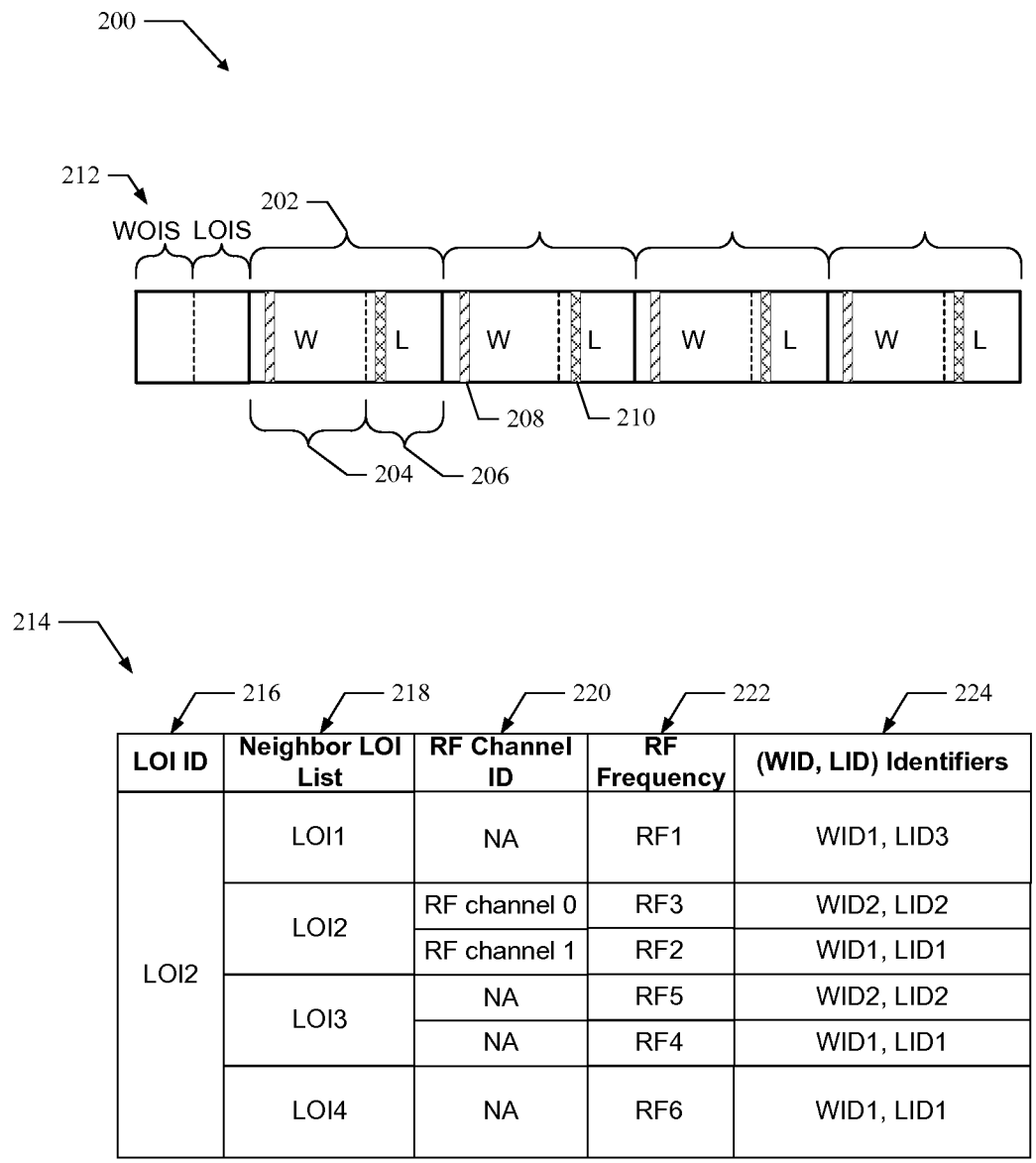
FIG. 2 shows a transmission frame and neighbor description information for use in aspects of a service acquisition system.

FIG. 2 shows a diagram of a transmission frame 200 for use in aspects of a service acquisition system. For example, the transmission frame 200 may be packed with wide and local content multiplexes and transmitted over the RF channels in the LOIs shown in FIG. 1.

The transmission frame 200 comprises four sub-frames, shown generally at 202, that are used to convey wide and local content. For example, each sub-frame 202 comprises a wide area partition 204 that is packed with wide area content, and a local area partition 206 that is packed with local area content.

Included in the wide area partition 204 is a wide area control channel 208. The wide area control channel 208 operates to convey overhead messages pertaining to wide area content multiplexes. Included in the local area partition 206 is a local area control channel 210. The local area control channel 210 operates to convey overhead messages pertaining to local area content multiplexes. In an aspect, the local area control channel is used to convey neighbor description information as part of the NDM message.

At the start of the transmission frame 200 are overhead information symbols (OIS) 212 that provide overhead information that is used to locate the wide area control channel, the local area control channel, and the wide and local content flows that are packed into the sub-frames 202. The OIS 212 comprises wide overhead information symbols (WOIS) and local overhead information symbols (LOIS). In an aspect, content flows are transmitted using Media Logical Channels inside the sub-frames 202. A single MLC may be used to carry one or more content flows.

In an aspect, neighbor description information contained in the NDM message is generated separately for each LOI and is configured to provide a list of RF channels associated with a selected LOI and its neighboring LOIs. In another aspect, a NDM message is generated for a selected group of LOIs (which may or may not be neighbors), and includes all neighboring LOIs for each of the LOI within the selected group of LOIs. Each of the RF channels described in the neighbor description information is associated with WID/LID descrambling identifiers.

In an aspect, the NDM message is distributed over a LOI using a local control channel that is part of the transmission frames transmitted by the RF channels in that LOI. It should be noted that the neighbor description information carried in the NDM may be formatted in any suitable format, encoded or encrypted, and/or reorganized or divided into two or more message components.

A table 214 illustrates how parameters provided in the NDM message may be organized and stored at a device. The table 214 comprises a LOI identifier 216 that identifies device 112's current LOI (i.e., LOI2). The table 214 also includes a Neighbor LOI List 218 that identifies neighboring LOIs of the device's current LOI plus the current LOI itself. The table 214 also includes RF channel identifiers 220, which indicate identifiers that may be used to reference to particular RF channels of the current LOI in other control channel messages. Note that the RF channel identifiers 220 are only provided for RF channels in the current LOI (i.e., LOI2).

The table 214 also comprises RF Frequency identifiers 222 that identify RF frequencies associated with each LOI identified in the Neighbor LOI List 218. The table 214 also comprises WID/LID Identifiers 224 that identify WID/LID descrambling sequence identifiers associated with each RF Frequency 222. Thus, the table 214 may be created and stored at a receiving device and used during operation of the network service acquisition system.

Figure 3:
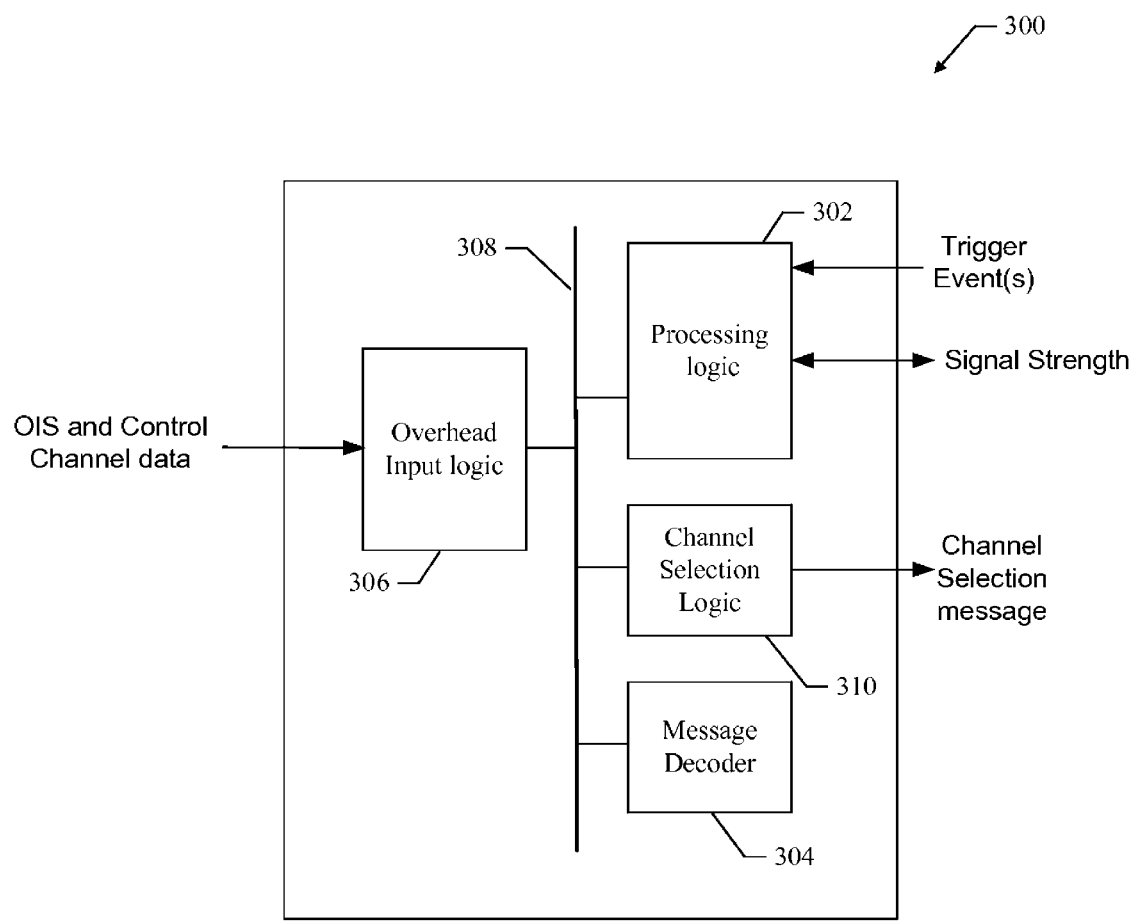
FIG. 3 shows service acquisition logic for use in aspects of a service acquisition system.

FIG. 3 shows service acquisition logic 300 for use in aspects of a service acquisition system. For example, the service acquisition logic 300 is suitable for use as the service acquisition logic 118 shown in FIG. 1. The service acquisition logic 300 comprises processing logic 302, message decoder 304, channel selection logic 310, and overhead input logic 306 all coupled to a data bus 308.

The overhead input logic 306 comprises at least one of a CPU, processor, gate array, hardware logic, memory elements, and/or hardware executing software. The overhead input logic 306 operates to receive OIS and control channel data over an RF channel to which a device is currently tuned. The overhead input logic 306 passes the received CC data to the message decoder 304. For example, the overhead input logic 306 operates to receive an NDM message that is transmitted over a local control channel as illustrated in FIG. 2.

The message decoder 304 comprises at least one of a CPU, processor, gate array, hardware logic, memory elements, and/or hardware executing software. In an aspect, the message decoder 304 operates to decode an NDM message received by the control channel input logic 306. For example, the message decoder 304 operates to decode the received NDM message to determine available RF channels associated with the current LOI and its neighboring LOs. The message decoder 304 decodes the received NDM message to determine WID/LID descrambling sequence identifiers associated with each RF channel in the device's current LOI and its neighboring LOs. For example, the information received in the NDM message is organized and stored as illustrated in FIG. 2. The WID/LID information associated with RF channels in the NDM message is used to descramble content when decoding content flows.

The processing logic 302 comprises at least one of a CPU, processor, gate array, hardware logic, memory elements, and/or hardware executing software. In an aspect, the processing logic 302 operates to receive one or more trigger events which indicate that service acquisition is desired. For example, in an aspect, the processing logic 302 determines that service acquisition is desired as a result of a power-up condition trigger event. In another aspect the processing logic 302 determines that service acquisition is desired as a result of service loss trigger event. In still another aspect, the processing logic 302 determines that service acquisition is desired based on OIS monitoring trigger event.

When service acquisition is desired, the processing logic 302 operates to perform an acquisition algorithm to determine a selected RF channel through which service is acquired. The service acquisition involves acquiring OIS and control channel information from the selected RF channel.

The channel selection logic 310 comprises at least one of a CPU, processor, gate array, hardware logic, memory elements, and/or hardware executing software. The channel selection logic 310 operates to generate an RF channel selection message that identifies a selected RF channel through which service is acquired. The RF channel selection message is sent to the device receiver 116. With this information, the receiver 116 can quickly tune to the selected RF channel to acquire the OIS and control channel information as part of the network service acquisition. Thus, during service acquisition, an RF channel can be selected through which service is acquired in a multi-frequency network.

In an aspect, the service acquisition system comprises a computer program product having one or more program instructions ("instructions") or sets of "codes" stored or embodied on a machine-readable medium, which when executed by at least one processor, for instance, a processor at the processing logic 302, causes the processor to provide the functions described herein. For example, the sets of codes may be embodied on a machine-readable medium, such as a floppy disk, CDROM, memory card, FLASH memory device, RAM, ROM, or any other type of memory device or machine-readable medium that interfaces to the service acquisition logic 300. In another aspect, the sets of codes may be downloaded into the service acquisition logic 300 from an external device or network resource. The sets of codes, when executed, cause a processor to provide aspects of a service acquisition system as described herein.

RF Channel Monitoring

In an aspect, the service acquisition system at the device operates to perform monitoring of RF channels carried in the device's current and neighboring LOIs to maintain information related to signal strength for these RF channels. For example, the processing logic 302 operates to obtain a received signal strength indicator (RSSI) for RF channels in the current LOI and neighboring LOs. For each available RF channel, the processing logic 302 may also maintain timestamps associated with RSSI measurements. The timestamps associated with RSSI measurements can be used to invalidate old RSSI entries. The processing logic 302 operates to maintain tables of RF channel monitoring information in a local memory. During service acquisition, the processing logic 302 utilizes information collected during RF channel monitoring to select an RF channel for service acquisition.

Power-Up Service Acquisition

In an aspect, the service acquisition system operates to acquire network services in response to a power-up event. Each device is pre-provisioned with a list of RF frequencies and associated channel plan (RF bandwidth). The pre-provisioned RF list includes RFs to accommodate mobility/roaming of a device between different network deployment areas. Associated WIDs and LIDs may not be pre-provisioned as these can be detected based on received WID/LID energy, which provides flexibility for network planning. When a device is powered on for the very first time, the service acquisition system uses this pre-provisioned (PP) RF list to acquire the network service on one of the RFs carried in device's current area from the PP RF list. Once a device acquires the network service in its current area, it receives a list of RF channels in the current LOI and neighboring LOIs as part of an NDM control channel message. The service acquisition system stores the list of RF frequencies (which is referred to as an NDM RF list) and associated channel plan received as part of the NDM in persistent storage. The NDM RF List includes all RFs received in an NDM (RFs in the current LOI and neighboring LOIs).

In an aspect, the NDM RF list is used to acquire the network service during a subsequent power-up. This allows for a fast search since the entire PP RF list does not have to be searched. Also, the service acquisition system determines the best RF available in the current area to acquire the service and not just any RF that is configured in the PP RF list. Note that a PP RF list may only contain a basic set of RFs deployed in a multiple frequency network which may not include all RFs in a given deployment area.

If the network service is not acquired using the NDM RF list, the acquisition system reverts back to the PP RF list to acquire the service. This may happen if the device has moved to a new operating area which does not have any RF in common with the previous operating area. This may also happen if the device is experiencing a long fade condition. When a device moves into a new area, a newly received NDM RF list overwrites the previously stored NDM RF list.

At power-up, the service acquisition system monitors all neighboring RFs using the RF monitoring method described above, which is asynchronous and does not require any timing information. The list of the neighboring RFs to be monitored is determined based on an NDM RF list if available; else RFs to be monitored are determined based on the PP RF list. In an aspect, a System Acquisition (inner loop) algorithm is performed at power up. The System Acquisition (inner loop) is also triggered under following conditions.

1. Service acquisition failure during periodic OIS monitoring.
2. Service acquisition failure as part of acquiring content flow data In an aspect, to minimize system acquisition time, as soon as the WOIS is acquired on an RF, the system acquisition (inner loop) exits and a 'wide system acquired' indication is sent to the upper layer. The LOIS is also acquired on the same RF as the WOIS. Also, the wide and local control channels are acquired on the same RF during as the WOIS and LOIS. The control channel data is acquired at power-up to enable a device to start receiving content flow data. The control channel data is not stored persistently across device power-ups. In an aspect, if the LOIS is not acquired on same RF as the WOIS, a 'Local System Acquisition (outer loop)' algorithm is initiated. The 'Local System Acquisition (outer loop)' algorithm is captured in another section of this document. In another aspect if the CC is not acquired on the same RF as the WOIS and/or LOIS, a CC acquisition algorithm is initiated. The CC acquisition algorithm is captured in another section of this document.

System Acquisition (Inner Loop)

The network service acquisition is also referred to herein as 'system acquisition.' In various aspects, the system acquisition inner loop is used to acquire network service under following conditions.

1. System acquisition at power-up.
2. System acquisition when loss of system is detected during OIS monitoring.
3. Outer-loop based system acquisition attempt when system in not currently acquired.

4. System acquisition as a result of content flow request from applications/user when system in not currently acquired.
5. System acquisition when loss of system is detected after data acquisition fails for content flows.

The system acquisition inner loop exits either when at least the WOIS is acquired on an RF or when a 'system acquisition timer' expires.

The system acquisition inner loop is first executed with the NDM RF list if available on the device or with the PP RF list if the NDM RF list is not available on the device. If the network system is not acquired using the NDM RF list and if NDM RF list is different than the PP RF list, the system acquisition inner loop is executed again using the PP RF list. Hence, if the NDM RF list and the PP RF lists are different, the inner loop is run twice. Note that if the NDM RF list is not cached on the device, or if the NDM RF list is exactly same as the PP RF list, the inner loop is run only once.

The system acquisition inner loop is executed for a finite duration based on the value of a 'System_Acq_Timer' parameter. System_Acq_Timer defines the overall minimum time period for which system acquisition inner loop is executed if the system could not be acquired. The System_Acq_Timer is set to appropriate values based on conditions under which the system acquisition inner loop is invoked. The expiry of System_Acq_Timer is a condition used to exit the inner loop if the system could not be acquired. The expiry of this timer is checked only at certain points in the inner loop algorithm and not after every second. This is to ensure that all good RFs are examined at least once for system acquisition irrespective of the System_Acq_Timer expiry.

Figure 4:
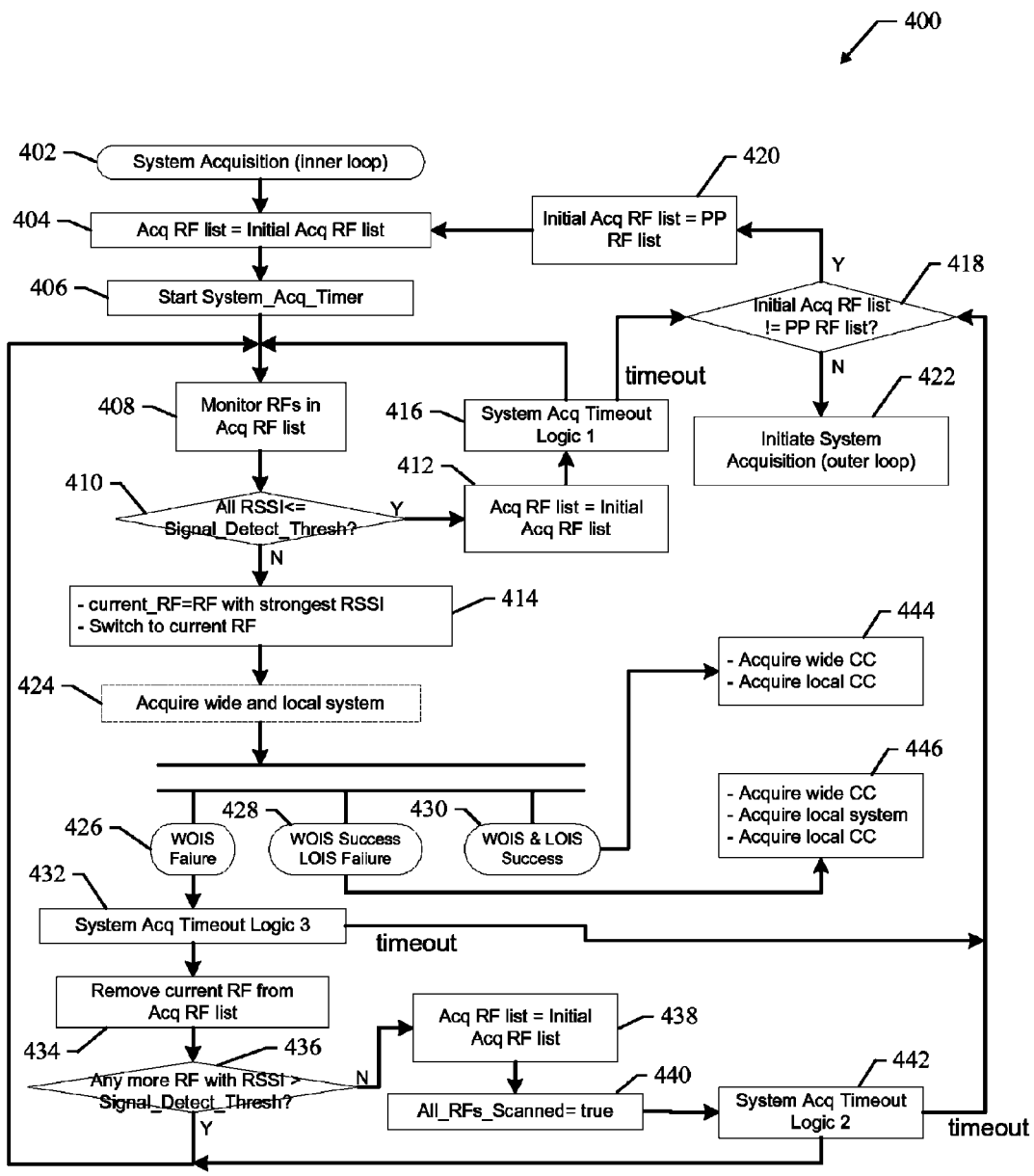
FIG. 4 shows a method for performing an inner loop algorithm for use in aspects of a service acquisition system.

FIG. 4 shows a method 400 for performing a system acquisition inner loop algorithm for use in aspects of a service acquisition system. For clarity, the method 400 is described herein with reference to the service acquisition logic 300 shown in FIG. 3. For example, in an aspect, the processing logic 302 executes one or more sets of codes to control the service acquisition logic 300 to perform the functions described below.

At block 402, the system acquisition inner loop algorithm begins.

At block 404, an acquisition RF list (Acq RF list) is set to the initial acquisition RF list. In an aspect, the processing logic 302 operates to set the initial acquisition RF list to the NDM RF list if the NDM RF list is available. The processing logic 302 operates to set the initial acquisition RF list to the PP RF list if the NDM RF list is not available.

At block 406, a system acquisition timer (System_Acq_Timer) is started. In an aspect, the processing logic 302 comprises timer logic that functions as the system acquisition timer. The system acquisition timer is set to a different predetermined value in different conditions under which the system acquisition inner loop is initiated. In the case of loss of system coverage, the system acquisition timer is set to a longer duration for the first execution of the system acquisition inner loop. The system acquisition timer is set to shorter durations for subsequent executions of the system acquisition inner loop to save battery power. The system acquisition timer settings in different conditions are captured as part of the system acquisition outer loop captured in another section of this document.

At block 408, RF channels in the acquisition RF list are monitored to measure their signal strength (RSSI). In an aspect, the processing logic 302 interfaces with the receiver on the device to measure RSSI for each RF in the acquisition RF list. A measure of the signal strength for each RF is then reported from the receiver back to the processing logic 302.

At block 410, a determination is made as to whether all the signal strength measurements associated with the RFs in the acquisition RF list are less than or equal to a selected signal detection threshold (Signal_Detect_Thresh). In an aspect, the processing logic 302 makes this determination. If all the RF signal strengths are less than or equal to the signal detection threshold, the method proceeds to block 412. If any of the RF signal strengths are greater than the signal detection threshold, the method proceeds to block 414.

At block 412, the acquisition RF list is reset to include all RFs in the initial acquisition RF list. Certain RFs may get removed from the acquisition RF list if the system can not be acquired on those RFs as part of the operations at block 434. The operations at block 412 are performed so that all the RFs in the initial acquisition RF list can be examined again for the RF monitoring operations at block 408.

At block 416, a determination is made as to whether the system acquisition timer has expired as part of the system acquisition timeout logic 1. In an aspect, the processing logic 302 makes this determination. For example, a timeout means the time interval during which the inner loop operates has ended. If the system acquisition timer has not expired, the method proceeds to block 408. If the system acquisition timer has expired (timeout path), the method proceeds to block 418.

At block 418, a determination is made as to whether the initial acquisition RF list is the same as the pre-programmed RF list. In an aspect, the processing logic 302 makes this determination. If the initial acquisition RF list is not equal to the PP RF list, the method proceeds to block 420. If the initial acquisition RF list is the same as the PP RF list, the method proceeds to block 422.

At block 420, the initial acquisition RF list is set to the PP RF list. In an aspect, the processing logic 302 makes this assignment and the method then proceeds to block 404.

At block 422, a system acquisition outer loop process is initiated. As part of the system acquisition outer loop, attempts are made to acquire the network service based on an outer loop acquisition schedule. The system acquisition outer loop is described in another section of this document.

At block 414, a current RF indicator is set to indicate the RF with the strongest RSSI among all RFs in the acquisition RF list. In an aspect, the processing logic 302 makes this assignment. The processing logic 302 then controls the channel selection logic 310 to output a selection message to a device receiver to switch to the current RF.

At block 424, a procedure is executed to acquire the wide and local system on the selected current RF channel. The processing logic 302 attempts to acquire the wide and local system on the current RF. In an aspect, the processing logic 302 attempts to acquire timing signals (TDM1 and TDM2), WIC, LIC, and OIS information associated with the wide and local system on the current RF.

Based on the result of the procedure performed at block 424, one of the following paths is taken. In an aspect, the result of the procedure performed at block 424 results in a WOIS failure path 426, a WOIS success and LOIS failure path 428, and a WOIS and LOIS success path 430.

At block 432, the WOIS failure path 426 begins. A determination is made as to whether the system acquisition timer has expired and also whether all good RFs (i.e., RFs with RSSI>Signal_Detect_Thresh) have been tried at least once for system acquisition (indicated by All_RFs_Scanned=true) as part of the system acquisition timeout logic 3. In an aspect, the processing logic 302 makes this determination. If the system acquisition timer has expired and all good RFs have been tried for system acquisition, the method proceeds to block 418. If the system acquisition timer has not expired or all goods RFs have not been tried for system acquisition, the method proceeds to block 434.

At block 434, the current RF is removed from the acquisition RF list. In an aspect, the processing logic 302 performs this function.

At block 436, a determination is made as to whether there are any more RFs left in the acquisition RF list with signal strength greater than the signal detection threshold. If there are no more such RFs, the method proceeds to block 438. If there are more RFs left in the acquisition RF list with signal strength greater than the signal detection threshold, the method proceeds to block 408.

At block 438, the acquisition RF list is reset to include all RFs in the initial acquisition RF list. Certain RFs may get removed from the acquisition RF list if the system can not be acquired on those RFs as part of the operations at block 434. The operations at block 438 are performed so that all the RFs in the initial acquisition RF list can be examined again for the RF monitoring operations at block 408.

At block 440, the All_RFs_Scanned parameter is set to true. This parameter indicates that all good RFs (i.e., RFs with RSSI>Signal_Detect_Thresh) have been tried at least once for system acquisition. In an aspect, the processing logic 302 operates to set the All_RFs_Scanned parameter to true to indicate that all RFs having RSSI greater than or equal to the signal detection threshold have been tried for system acquisition at least once.

At block 442, a determination is made as to whether the system acquisition timer has expired. In an aspect, the processing logic 302 makes this determination. If the system acquisition timer has expired (timeout path), the method proceeds to block 418. If the system acquisition timer has not expired, the method proceeds to block 408.

At block 446, the WOIS success and LOIS failure path 428 begins. The processing logic 302 initiates acquisition of the local system. The processing logic 302 also initiates acquisition of the wide and local CC.

At block 444, the WOIS success and LOIS success path 430 begins. The processing logic 302 initiates acquisition of the wide and local control channels.

Thus, the method 400 operates to perform a system acquisition inner loop algorithm to acquire the network service for use in aspects of a service acquisition system. It should be noted that the method 400 represents just one implementation and that other implementations are possible within the scope of the aspects.

System Acquisition Timeout Logic

The system acquisition (inner loop) includes multiple timeout determination blocks where expiry for the System_Acq_Timer is checked. These system acquisition timeout blocks are referred to as system acquisition timeout logic 1, 2 and 3, which are provided by the processing logic 302.

As part of system acquisition timeout logic 1 and 2, the System_Acq_Timer is checked for expiry. If the System_Acq_Timer has expired, the timeout logic exits (timeout path). If the timeout logic does not exit, the system acquisition inner loop algorithm continues.

The system acquisition timeout logic 3 checks for expiry of System_Acq_Timer as well as whether all RFs with RSSI>Signal_Detect_Thresh have been tried at least once (indicated by All_RFs_Scanned=true). If System_Acq_Timer has expired and All_RFs_Scanned=true, the timeout logic 3 exits (timeout path). If the timeout logic does not exit, the system acquisition inner loop algorithm continues.

Acquire Wide and Local System

Figure 5:
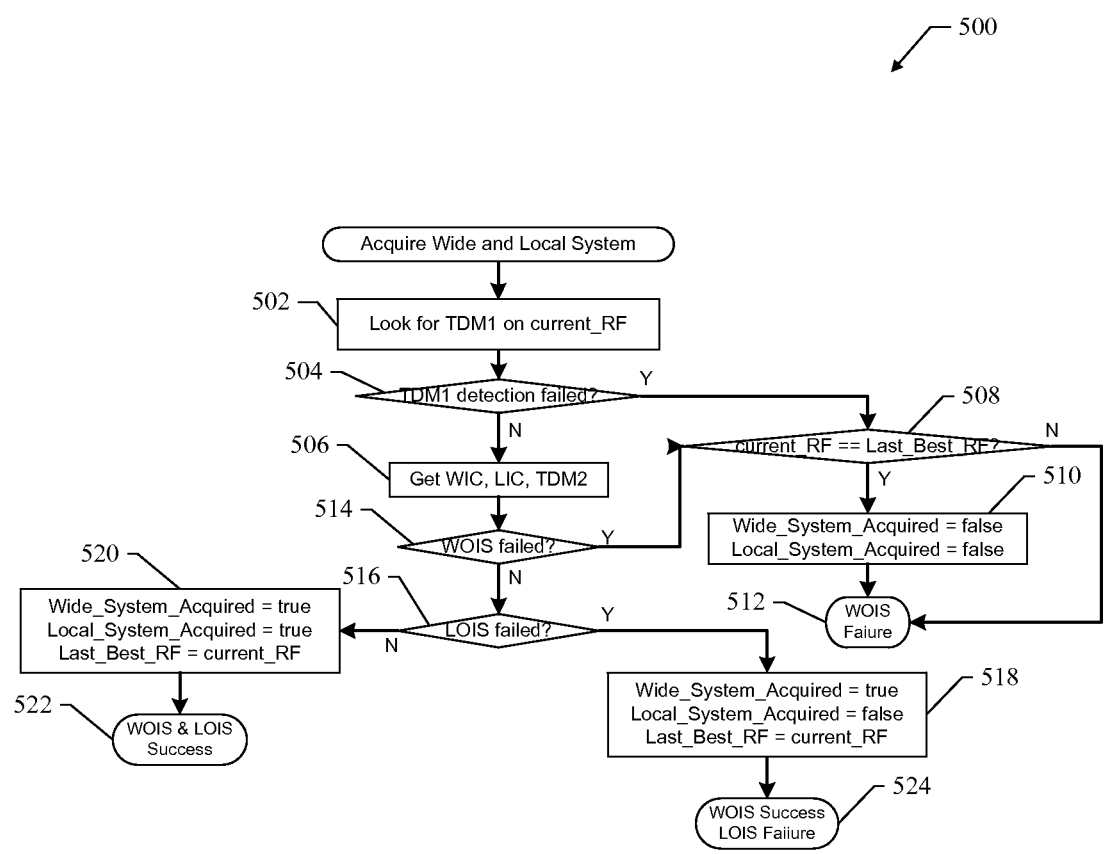
FIG. 5 shows a method for acquiring the wide and local system for use in aspects of a service acquisition system.

FIG. 5 shows a method 500 for acquiring the wide and local system for use in aspects of a service acquisition system. For example, the method 500 is suitable for use at block 424 of the method 400. In various aspects, the processing logic 302 executes one or more sets of codes to control the service acquisition logic 300 to perform the functions described below.

At block 502, the device attempts to acquire a coarse timing signal TDM1 on the current_RF. The processing logic 302 performs this function.

At block 504, a determination is made as to whether coarse timing signal TDM1 has been successfully detected on the current_RF. The processing logic 302 performs this function. If coarse timing has been successfully detected on the current RF, the method proceeds to block 506. If coarse timing has not been successfully detected on the current RF, the method proceeds to block 508.

At block 508, a determination is made as to whether the current_RF is equivalent to an RF referred to as the Last_Best_RF. In an aspect, the Last_Best_RF is set to the last RF where the wide system was successfully acquired. The Last_Best_RF parameter is maintained by the processing logic 302 and is used as a reference for evaluating handoff criteria as part of a CC handoff procedure (described in another section of this document). If the current_RF is the same as the Last_Best_RF the method proceeds to block 510. If the current_RF is not the same as the Last_Best_RF the method proceeds to block 512.

At block 510, a Wide_System_Acquired parameter is set to false and a Local_System_Acquired parameter is set to false to indicate that both the wide and local system are not acquired on the current RF.

At block 512, it is concluded that the WOIS (wide OIS) acquisition has failed on the current RF.

At block 506, acquisition of fine timing information (TDM2) and also overhead information channels (WIC and LIC) is performed. For example, the fine timing information and overhead information channels are obtained by the overhead input logic 306.

At block 514, an attempt is made to acquire the wide OIS (WOIS) and a determination is made as to whether WOIS acquisition failed on the current RF. In an aspect, the processing logic 302 attempts to acquire the WOIS on the current RF and then makes a determination whether the WOIS acquisition failed on current RF. If WOIS acquisition failed, the method proceeds to block 508. If WOIS acquisition succeeded, the method proceeds to block 516.

At block 516, an attempt is made to acquire the local OIS (LOIS) and a determination is made as to whether LOIS failed on the current RF. In an aspect, the processing logic 302 attempts to acquire the LOIS on the current RF and then makes a determination whether the LOIS acquisition failed on current RF If LOIS acquisition failed, the method proceeds to block 518. If LOIS acquisition succeeded, the method proceeds to block 520.

At block 520, the following system parameters are set to indicate that both wide and local system has been acquired on the current RF.

1. Wide_System_Acquired=true
2. Local_System_Acquired=true
3. Last_Best_RF=current_RF At block 522, it is concluded that the WOIS (wide OIS) and LOIS (local OIS) acquisition has been successful on the current RF.

At block 518, the following system parameters are set to indicate that wide system acquisition has succeeded on current RF and local system acquisition has failed on the current RF.

1. Wide_System_Acquired=true
2. Local_System_Acquired=false
3. Last_Best_RF=current_RF At block 524, it is concluded that the WOIS (wide OIS) acquisition has been successful and LOIS acquisition has failed on the current RF.

Thus, the method 500 operates to attempt to acquire a wide and local system for use in aspects of a service acquisition system. It should be noted that the method 500 represents just one implementation and that other implementations are possible within the scope of the aspects. As the result, the method 500 operates to set the following parameters to have the designated assigned values.

1. Wide_System_Acquired=true if WOIS gets acquired.
2. Wide_System_Acquired=false if WOIS does not get acquired.
3. Local_System_Acquired=true if LOIS gets acquired.
4. Local_System_Acquired=false if LOIS does not get acquired.
5. Last_Best_RF is set to the last RF where the wide system was last acquired.

It should be noted that in various aspects, the Wide_System_Acquired and Local_System_Acquired parameters indicate system acquisition status on the Last_Best_RF. The Last_Best_RF is set to the last RF where the wide system was last acquired. The Wide_System_Acquired and Local_System_Acquired parameters are updated in response to the following conditions.

1. Last_Best_RF parameter itself gets updated.
2. OIS acquisition status changes on Last_Best_RF.

Local Service Acquisition

If local OIS is not acquired on the current RF after the system acquisition inner loop exits, a local system acquisition algorithm is performed to attempt to acquire local OIS. In an aspect, there are two approaches specified to acquire local OIS.

Local Service Acquisition—Approach 1

In a first approach, if the local OIS is not acquired on the current RF, the service acquisition system performs one or more local system acquisition retries to acquire LOIS. The local system acquisition retry is attempted only on the current RF. A two stage local system acquisition retry mechanism is defined. The First_LocalSystemAcq_Retries parameter specifies the maximum number of tries to acquire the local OIS in first attempt. The first attempt of local system acquisition is executed in following scenarios.

1. Immediately after the system acquisition inner loop exits if LOIS was not acquired or;
2. As part of OIS monitoring, when the local OIS fails on an RF for the first time after the local system was acquired (with WOIS being successful).
3. When local OIS fails on an RF for the first time after the local system was acquired while decoding content flows If local OIS acquisition does not succeed after first attempt, the service acquisition system will attempt local OIS acquisition the next time WOIS is acquired. A Subsequent_LocalSystemAcq_Retries parameter specifies the maximum number of tries for local OIS acquisition in subsequent attempts. Subsequent attempts for local OIS acquisition can happen as part of periodic OIS monitoring or before the start of data MLC decoding. Once the local OIS is acquired on the current RF, the local system acquisition state gets reset. Afterwards, when the local OIS fails, the system will start the local system acquisition using the First_LocalSystemAcq_Retries parameter.

If the local OIS acquisition does not succeed after the first attempt, the service acquisition system will send a 'local system loss' indication to the upper layer. The service acquisition will send a 'local system acquired' indication to upper layer whenever the local OIS is acquired successfully after the local system was lost.

Local Service Acquisition—Approach 2

In a second approach, a local system acquisition outer loop is defined to acquire the local system. In this approach, the local system acquisition outer loop comprises an exponential back-off phase followed by a periodic reattempt phase. This approach attempts to acquire the local system aggressively in the beginning (using the exponential back-off phase) and then eventually acquire the local system periodically. As part of the exponential backoff phase, the service acquisition system repeats the local system acquisition outer loop at exponentially increasing time intervals until number of attempts reaches a predetermined maximum of reattempts (Local_N_Acq attempts) or the local system gets acquired. As part of the periodic reattempt phase, the device attempts to acquire service periodically if not already acquired during the exponential backoff phase. The local system acquisition outer loop parameters are reset whenever the wide system acquisition fails or both the wide and local system are acquired on the same RF.

A device can decode wide content flows without needing to acquire the local system. The local system acquisition outer loop is run only when the device is not in the process of decoding any wide content flows. In an aspect, the service acquisition system suspends the local system acquisition outer loop if decoding for wide content flows is started and resumes after decoding for these flows have been completed.

In an aspect, the service acquisition system executes the first local system acquisition outer loop immediately after acquiring wide only system. The local system acquisition outer loop starts by attempting to acquire the wide and local system on the Last_Best_RF if RSSI>Signal_Detect_Thresh for the Last_Best_RF. If RSSI<=Signal_Detect_Thresh for the Last_Best_RF, the system selects the RF with strongest RSSI to acquire the LOIS. If wide system acquisition fails on the selected RF, the service acquisition system initiates a system acquisition inner loop to acquire the wide system. If only the wide system was acquired on the selected RF, the service acquisition system attempts to acquire the local system on other RFs having RSSI>Signal_Detect_Thresh. The number of RFs which are tried for local system acquisition is based on the local system acquisition outer loop timeout logic.

Figure 6:
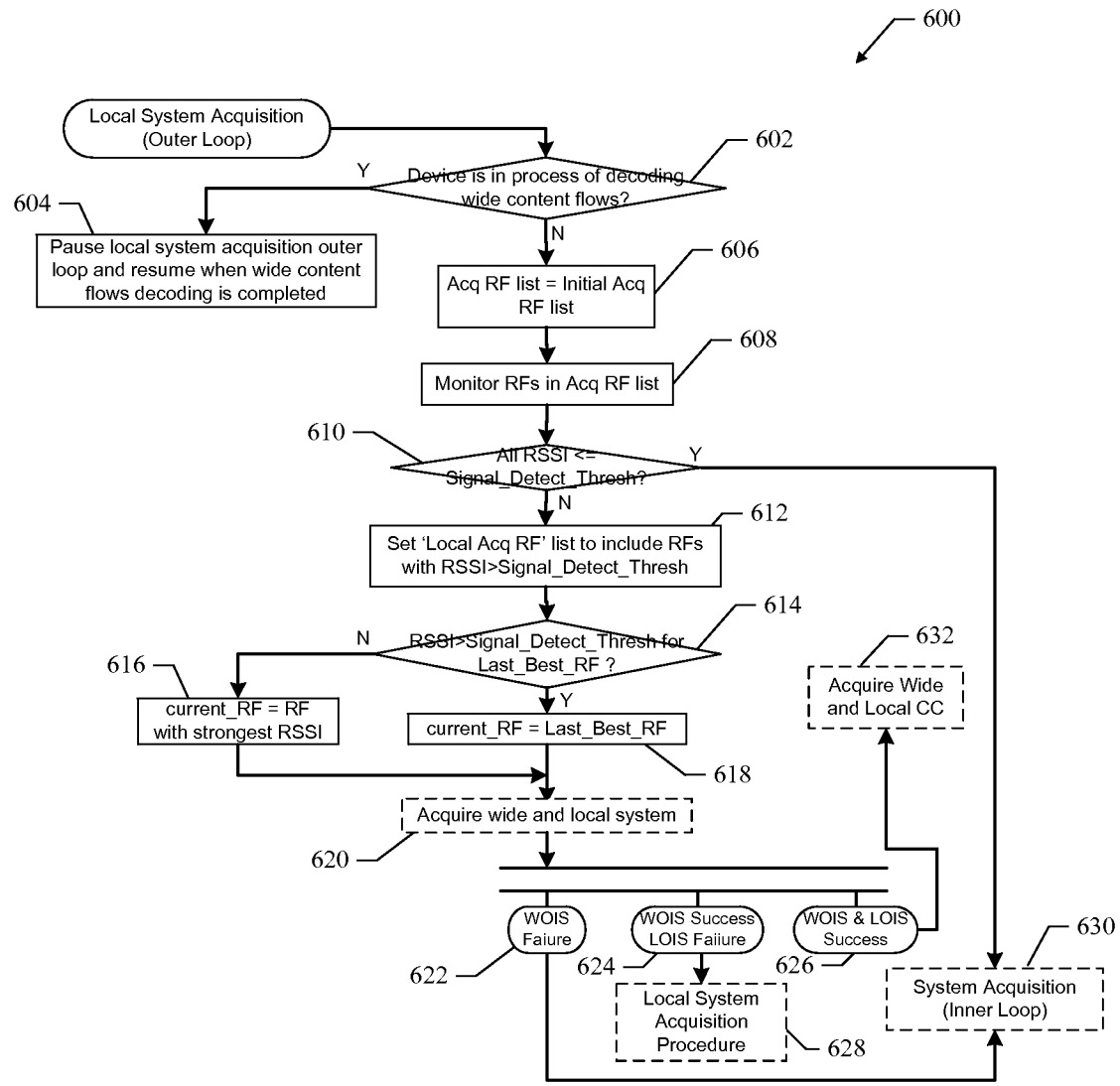
FIG. 6 shows a method for a local service reacquisition outer loop for use in aspects of a service reacquisition system.

FIG. 6 shows a method 600 for a local system acquisition outer loop for use in aspects of a service reacquisition system. For clarity, the method 600 is described herein with reference to the service acquisition logic 300 shown in FIG. 3. For example, in an aspect, the processing logic 302 executes one or more sets of codes to control the service acquisition logic 300 to perform the functions described below.

At block 602, a determination is made as to whether device is in process of decoding wide content flows. In an aspect, the processing logic 302 operates to make this determination. If the device is in process of decoding wide content flows, the method proceeds to block 604. If the device is not in process of decoding wide content flows, the method proceeds to block 606.

At block 604, the local system acquisition outer loop is suspended until the device is done with decoding of wide content flows.

At block 606, an acquisition RF list (Acq RF list) is set to an initial acquisition RF list. In an aspect, the processing logic 302 operates to set the initial acquisition RF list to the NDM RF list if the NDM RF list is available. The processing logic 302 operates to set the initial acquisition RF list to the PP RF list if the NDM RF list is not available.

At block 608, RF channels in the acquisition RF list are monitored to measure their signal strength (RSSI). In an aspect, the processing logic 302 interfaces with the receiver on the device to measure RSSI for each RF in the acquisition RF list.

At block 610, a determination is made as to whether the signal strengths of all the RFs identified in the acquisition RF list are less than or equal to a selected signal detection threshold (Signal_Detect_Thresh). If all identified RFs are less than or equal to the signal detection threshold, the method proceeds to block 630. If any identified RF is greater than the signal detection threshold, the method proceeds to block 612.

At block 612, a Local acquisition RF list is set to identify RFs that have signal strength greater than the signal detection threshold.

At block 614, a determination is made as to whether the signal strength for the Last_Best_RF is greater than the signal detection threshold. If the signal strength is not greater than the signal detection threshold the method proceeds to block 616. If the signal strength for Last_Best_RF is greater than the signal detection threshold, the method proceeds to block 618.

At block 616, the current_RF is set to be equal to the RF with the strongest signal strength.

At block 618, the current_RF is set to be equal to the Last_Best_RF.

At block 620, wide and local system acquisition is performed on the current RF channel. For example the processing logic 302 attempts to acquire the wide and local system on the current RF using the method 500 shown in FIG. 5. Based on the result of the procedure performed at block 620, one of the following paths is taken. In an aspect, the result of the procedure performed at block 620 results in a WOIS failure path 622, a WOIS success and LOIS failure path 624, and a WOIS and LOIS success path 626.

At block 622, the result of the wide and local system acquisition is WOIS failure indicating that wide OIS is not acquired on the current RF. The method proceeds to block 630.

At block 624, the result of the wide and local system acquisition is WOIS success and LOIS failure, indicating that wide OIS is acquired on current RF but local OIS is not acquired on current RF. The method proceeds to block 628 to attempt to acquire local system on other RFs.

At block 626, the result of the wide and local system acquisition is WOIS and LOIS success, indicating that both wide OIS and local OIS are acquired on current RF. The method proceeds to block 632.

At block 628, a local system acquisition procedure is executed to acquire the local OIS.

At block 630, the system acquisition inner loop algorithm is executed as defined by the method 400 shown in FIG. 4 to acquire wide system on one of the RFs in the multi-frequency network.

At block 632, wide and local control channel information is acquired on the current RF.

Thus, the method 600 operates to perform a local system acquisition outer loop procedure to acquire the local system for use in aspects of a service acquisition system. It should be noted that the method 600 represents just one implementation and that other implementations are possible within the scope of the aspects.

Figure 7:
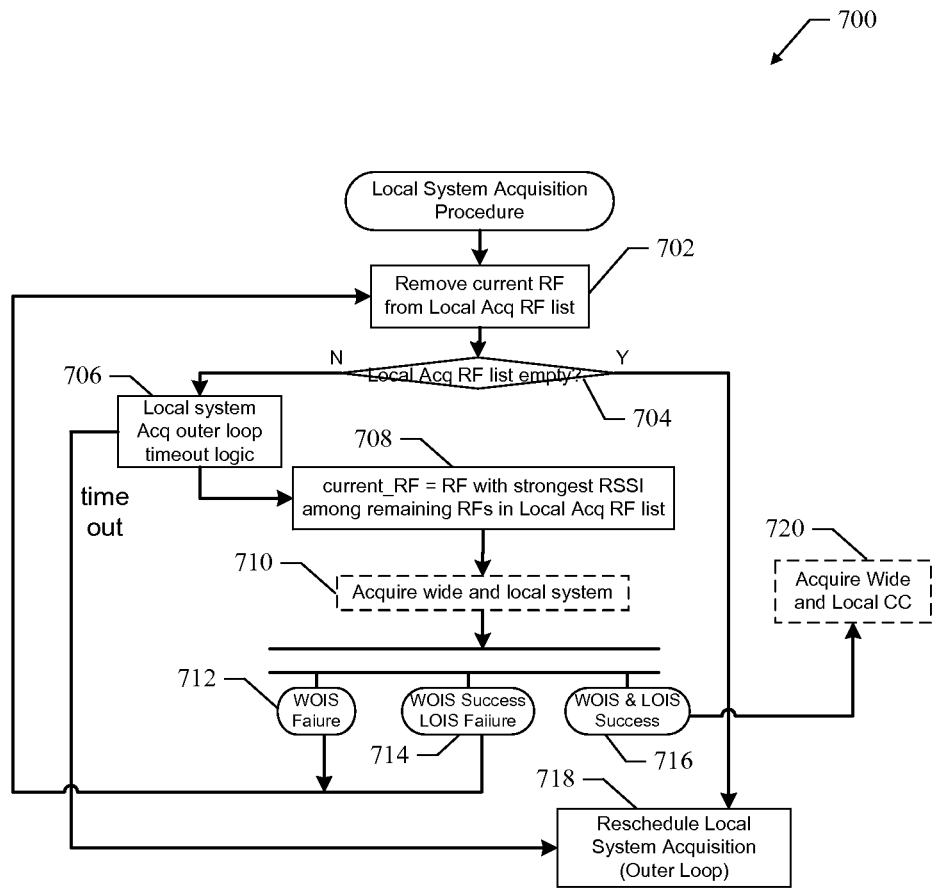
FIG. 7 shows a method for a local service reacquisition for use in aspects of a service reacquisition system.

FIG. 7 shows a method 700 for a local system acquisition procedure for use in aspects of a service reacquisition system. For example, the method 700 is suitable for use at block 628 of the method 600. For clarity, the method 700 is described herein with reference to the service acquisition logic 300 shown in FIG. 3. For example, in an aspect, the processing logic 302 executes one or more sets of codes to control the service acquisition logic 300 to perform the functions described below.

At block 702, the current RF (where the local OIS failed) is removed from the Local acquisition RF list.

At block 704, a determination is made as to whether the Local acquisition list is empty. If the list is empty, the method proceeds to block 718. If the list is not empty, the method proceeds to block 706.

At block 706, a determination is made as to whether a local system acquisition timer has expired as part of a 'local system acquisition outer loop timeout logic'. In an aspect, if the local system acquisition timer has expired (timeout path), the method proceeds to block 718. If the local system acquisition timer has not occurred, the method proceeds to block 708.

At block 708, the current_RF is set to the RF having the strongest signal strength of the RFs remaining in the local acquisition RF list.

At block 710, a wide and local system acquisition procedure is executed. For example the processing logic 302 attempts to acquire the wide and local system on the current RF using the method 500 shown in FIG. 5. Based on the result of the procedure performed at block 710, one of the following paths is taken. In an aspect, the result of the procedure performed at block 710 results in a WOIS failure path 712, a WOIS success and LOIS failure path 714, and a WOIS and LOIS success path 716.

At block 712, the wide and local acquisition procedure resulted in a WOIS failure indicating that wide OIS acquisition failed on the current RF. The method proceeds to block 702 to attempt to acquire local system on other RFs in the local Acq RF list.

At block 714, the wide and local acquisition procedure resulted in a WOIS success and a LOIS failure, indicating that wide OIS is acquired on current RF but local OIS is not acquired on current RF. The method proceeds to block 702 to attempt to acquire local system on other RFs in the local Acq RF list.

At block 716, the wide and local acquisition procedure resulted in a WOIS and LOIS success, indicating that both wide OIS and local OIS are acquired on current RF. The method proceeds to block 720 to acquire wide and local control channels on the current RF.

At block 720, a wide and local control channel acquisition procedure is executed to acquire wide and local control channels.

At block 718, local system acquisition outer loop is rescheduled based on the outer loop timer schedule.

Thus, the method 700 operates to perform a local system acquisition procedure to acquire local system for use in aspects of a service acquisition system. It should be noted that the method 700 represents just one implementation and that other implementations are possible within the scope of the aspects.

Control Channel Acquisition

In various aspects, a device does not store CC data persistently across power cycles. The latest CC data should be acquired at power-up and whenever the CC is updated. Updates to CC information are indicated by the CC sequence number received in the OIS. Once at least the WOIS is acquired on an RF, the system acquisition (inner loop) is exited and CC acquisition is initiated. There are two approaches that may be used to acquire the CC as described below.

Control Channel Acquisition—Approach 1

If a first approach for CC acquisition, the service acquisition system attempts to acquire the CC only on the current RF after the wide OIS is successfully acquired on the current RF. The acquisition for wide and local CC is done independently.

The CC acquisition is started immediately after WOIS is acquired. A Wide_Max_CC_Retries parameter specifies the maximum number of times wide CC acquisition is tried in one attempt. For local CC acquisition, the local OIS needs to be acquired first. Hence for local CC, the CC retry count starts only after the local OIS is successfully acquired on the current RF using the local system acquisition approach 1. A Local_Max_CC_Retries parameter specifies the maximum number of times the local CC acquisition is tried in one attempt. If wide and/or local CC acquisition does not succeed after the maximum number of tries, the device will acquire the CC data the next time WOIS and LOIS is successfully acquired, either as part of the next OIS monitoring or before the start of content flows decoding. If CC acquisition fails during the decoding of content flows, the device will continue to decode MLCs for content flows and attempt to acquire the CC on the current RF based on a Max_CC_Retries parameter. For example if wide CC acquisition failed, the device attempts to acquire wide CC on current RF for up to Wide_Max_CC_Retries attempts.

Control Channel Acquisition—Approach 2

In a second approach for CC acquisition, if the CC can not be acquired on the current RF, the service acquisition system attempts to acquire the CC on other available RFs in the multi-frequency network. If both wide and local CC acquisition fails on the current RF, the device initiates a CC Handoff procedure to attempt to acquire the CC on other RFs in the multi-frequency network. If the CC acquisition fails a selected consecutive number of times on a given RF, the device removes that RF from the CC handoff RF list. If the CC acquisition fails a selected consecutive number of times collectively over all RFs in the multi-frequency, the device gives up acquiring the CC and initiates a 'CC acquisition outer loop.

The CC acquisition outer loop is different from the system acquisition outer loop. As part of the CC acquisition outer loop, the device attempts to acquire the CC data using a periodic reattempt phase. Before initiating the CC acquisition outer loop, the device resets the CC acquisition related timers and CC handoff RF list. Whenever the CC acquisition outer loop periodic timer (CC_outer_loop_periodic_timer) expires, the device initiates the CC acquisition on the current RF. The CC outer loop timer interval should be less than a periodic OIS monitoring (PeriodicOISMonitor_timer) interval to be more aggressive for CC acquisition. The periodic OIS monitoring is disabled during the CC acquisition outer loop.

If only the wide OIS is acquired on current RF, then the wide CC can be acquired on that RF. If both the wide OIS and local OIS are acquired on the current RF, then both the wide CC and local CC can be acquired on that RF. If only the local CC is updated based on the local OIS, then only the local CC is acquired on the current RF. The CC acquisition procedures are defined separately for acquiring both wide+local CC, wide CC only and local CC only. If at least one of the CC's is decoded successfully, acquisition related timers and CC handoff RF list are reset.

Figure 8:
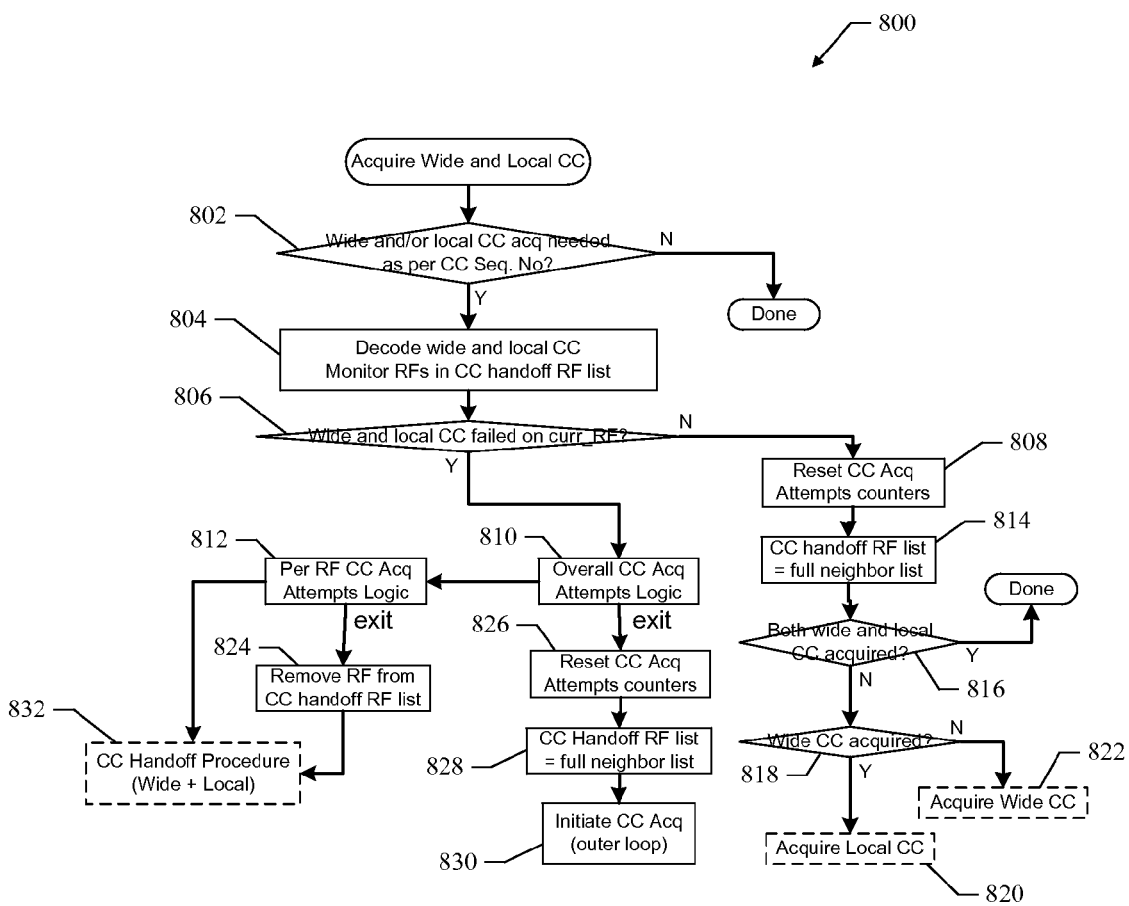
FIG. 8 shows a method for acquiring a wide and a local control channel for use in aspects of a service acquisition system.

FIG. 8 shows a method 800 for acquiring both wide and local control channels for use in aspects of a service acquisition system. For example, the method 800 is suitable for use at block 444 of the method 400. For clarity, the method 800 is described herein with reference to the service acquisition logic 300 shown in FIG. 3. For example, in an aspect, the processing logic 302 executes one or more sets of codes to control the service acquisition logic 300 to perform the functions described below.

At block 802, a determination is made as to whether it is necessary to acquire the wide and/or local control channel. In an aspect, the processing logic 302 makes this determination by evaluating control channel sequence numbers received in the OIS that indicates whether or not the associated control channel has been updated. If the control channel has been updated and it is necessary to acquire the new control channel data, the method proceeds to block 804. If the control channel has not been updated, the method ends.

At block 804, the wide and local control channel data is acquired. In an aspect, the overhead input logic 306 operates to acquire the wide and local control channel data. While acquiring the CC on the current RF, the device also monitors other RFs in the CC handoff RF list to measure their signal strength (RSSI). The device measures RSSI of other RFs during gaps of idle time when decoding CC MLCs on the current RF. The CC handoff RF list is initiated to all RFs available in the current LOI and neighboring LOIs.

At block 806, a determination is made as to whether the acquisition of the wide and local control channel on the current_RF has failed. If the CC acquisition has not failed for the wide CC and/or local CC, the method proceeds to block 808. If the acquisition of the wide and local control channel has failed, the method proceeds to block 812.

At block 808, control channel acquisition attempts counters are reset. In an aspect, two control channel acquisition attempts counters are utilized to count the number of overall and per RF control channel acquisition attempts, respectively. These counters are provided and maintained by the processing logic 302.

At block 814, the CC handoff RF list is set to the full neighbor RF list which includes RFs in current LOI and its neighboring LOIs.

At block 816, a determination is made as to whether both the wide and local control channels have been acquired on the current RF. If both the wide and local control channels have been acquired, the method ends. If both the wide and local control channels have not been acquired, the method proceeds to block 818.

At block 818, a determination is made as to whether the wide control channel has been acquired on the current RF. If the wide control channel has been acquired, the method proceeds to block 820 to acquire local CC. If the wide control channel has not been acquired, the method proceeds to block 822 to acquire the local CC.

At block 810, a determination is made as to whether an overall CC acquisition attempts value has been reached. The overall CC acquisition attempts value defines the number of times the CC acquisition should be attempted over all RFs in the multi-frequency network. For example, in an aspect, the processing logic 302 compares the overall CC acquisition attempts counter to the overall CC acquisition attempts value to make this determination. If the overall CC acquisition attempts value has not been reached, the method proceeds to block 812. If the overall CC acquisition attempts value has been reached (exit path), the method proceeds to block 826.

At block 812, a determination is made as to whether a 'Per RF CC acquisition attempts' value has been reached for the current RF. The Per RF CC acquisition attempts value defines the number of times the CC acquisition should be attempted consecutively on a given RF. For example, in an aspect, the processing logic 302 compares the Per RF CC acquisition attempts counter to the Per RF CC acquisition attempts value to make this determination. If the Per RF CC acquisition attempts value has not been reached for current RF, the method proceeds to block 832. If the Per RF CC acquisition attempts value has been reached (exit path) for current RF, the method proceeds to block 824.

At block 832, a wide+local control channel handoff procedure is performed to attempt to acquire CC on set of RFs in the CC handoff RF list.

At block 824, the current RF is removed from the CC handoff RF list and the method then proceeds to block 832 to attempt to acquire CC on other RFs in the CC handoff RF list.

At block 826, control channel acquisition attempts counters are reset. In an aspect, two control channel acquisition attempts counters are utilized to count the number of overall and per RF control channel acquisition attempts, respectively. These counters are provided and maintained by the processing logic 302.

At block 828, the CC handoff RF list is set to equal the full neighbor RF list which includes RFs in current LOI and its neighboring LOIs.

At block 830, a CC acquisition outer loop procedure is initiated. As part of the CC acquisition outer loop procedure, the CC acquisition is attempted based on a periodic outer loop timer.

Thus, the method 800 operates to acquire wide and local control channels for use in aspects of a service acquisition system. It should be noted that the method 800 represents just one implementation and that other implementations are possible within the scope of the aspects.

Figure 9:
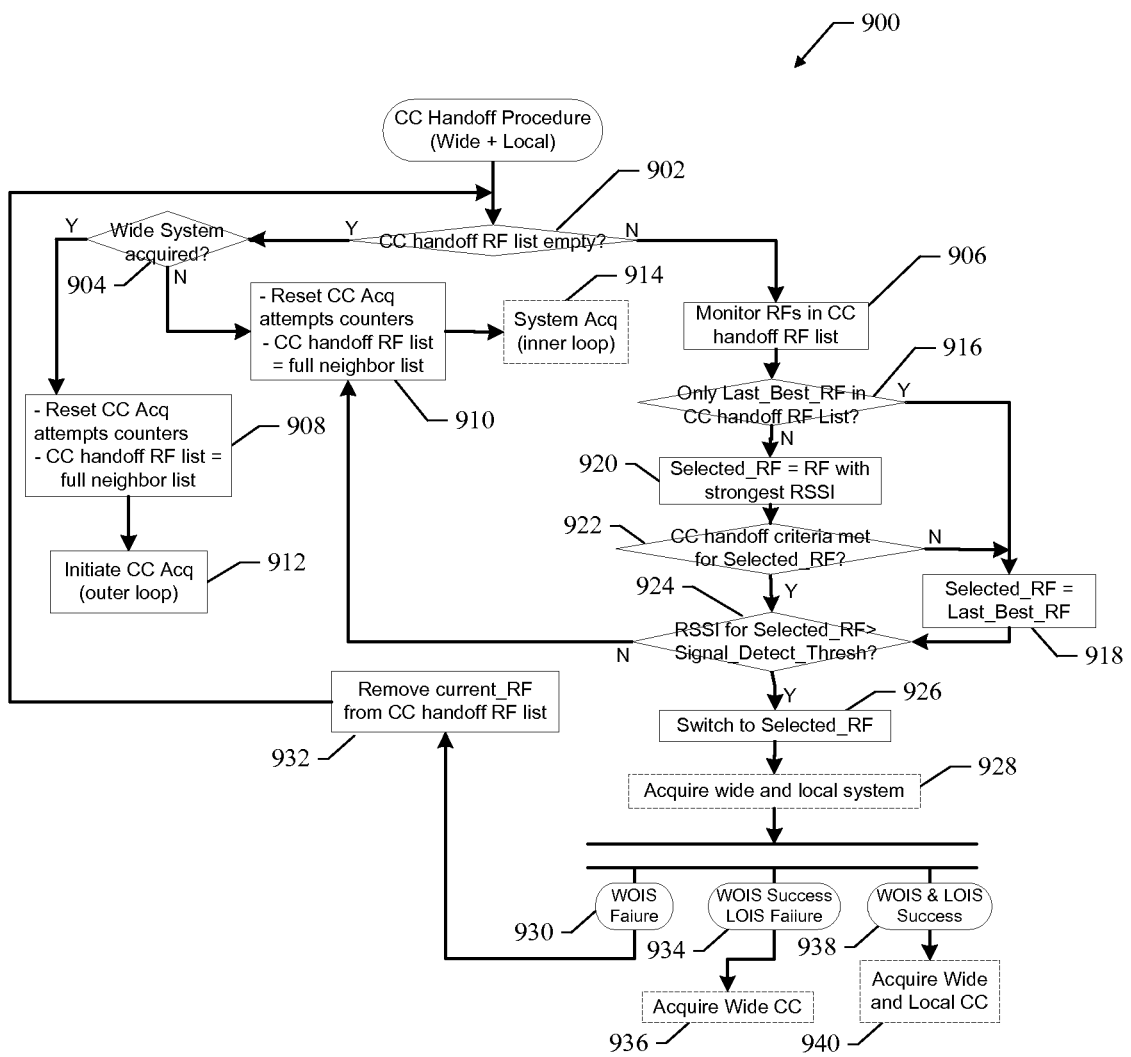
FIG. 9 shows a method for performing a wide+local control channel handoff procedure for use in aspects of a service acquisition system.

FIG. 9 shows a method 900 for performing a wide+local control channel handoff procedure for use in aspects of a service acquisition system. For example, the method 900 is suitable for use at block 832 of the method 800. For clarity, the method 900 is described herein with reference to the service acquisition logic 300 shown in FIG. 3. For example, in an aspect, the processing logic 302 executes one or more sets of codes to control the service acquisition logic 300 to perform the functions described below.

At block 902, a determination is made as to whether a CC handoff RF list is empty. In an aspect, the processing logic 302 makes this determination. If the CC handoff RF list is empty, the method proceeds to block 904. If the CC handoff RF list is not empty, the method proceeds to block 906.

At block 904, a determination is made as to whether the wide system is acquired on the current RF. In an aspect, the processing logic 302 makes this determination. If the wide system is acquired on current RF, the method proceeds to block 908. If the wide system is not acquired on the current RF, the method proceeds to block 910.

At block 908, control channel acquisition attempts counters are reset. In an aspect, two control channel acquisition attempts counters are utilized to count the number of overall and per RF control channel acquisition attempts, respectively. These counters are provided and maintained by the processing logic 302. The CC handoff RF list is set equal to the full neighbor RF list. In an aspect, the processing logic 302 performs these functions.

At block 912, a control channel acquisition outer loop procedure is initiated. As part of the CC acquisition outer loop procedure, the CC acquisition is attempted based on a periodic outer loop timer.

At block 910, control channel acquisition attempts counters are reset. In an aspect, two control channel acquisition attempts counters are utilized to count the number of overall and per RF control channel acquisition attempts, respectively. These counters are provided and maintained by the processing logic 302. The CC handoff RF list is set equal to the full neighbor RF list. In an aspect, the processing logic 302 performs these functions.

At block 914, a system acquisition inner loop is performed as described in the method 400 shown FIG. 4.

At block 906, RFs in the CC Handoff RF list are monitored to measure signal strength for these RFs.

At block 916, a determination is made as to whether the Last_Best_RF is the only RF identified in the CC handoff RF list. If the Last_Best_RF is the only RF identified in the CC handoff RF list, the method proceeds to block 918. If Last_Best_RF is not the only RF identified in the CC handoff RF list, the method proceeds to block 920.

At block 920, the RF with the strongest RSSI in the CC handoff RF list is selected as the Selected_RF. In an aspect, the processing logic 302 makes this selection.

At block 922, a determination is made as to whether control channel handoff criteria have been met for the Selected_RF. For example, the handoff criteria determines if (RSSI(Selected_RF))>RSSI(Last_Best_RF)+CC_Hys) is satisfied for the Selected_RF, where CC_Hys is a RSSI hysteresis value. If the CC handoff criteria have been met, the method proceeds to block 924. If the CC handoff criteria have not been met, the method proceeds to block 918.

At block 924, a determination is made as to whether the signal strength for the Selected_RF is greater than a signal detection threshold. If the signal strength is greater than the signal detection threshold, the method proceeds to block 926. If the signal strength is less or equal to the signal detection threshold, the method proceeds to block 910.

At block 918, the Selected_RF is set to be the Last_Best_RF.

At block 926, a RF channel switch to the Selected_RF is performed.

At block 928, the wide and local system acquisition procedure is performed as described with reference to the method 500 shown in FIG. 5.

At block 930, the result of the wide and local system acquisition is WOIS failure, indicating that the wide OIS is not acquired on the current RF. The method proceeds to block 932.

At block 932, the current_RF is removed from the CC handoff RF list because the wide OIS failed on the current RF. The method proceeds to block 902.

At block 934, the result of the wide and local system acquisition is WOIS success and LOIS failure, indicating that the wide OIS is acquired on the current RF and the local OIS is not acquired on the current RF. The method proceeds to block 936.

Figure 10:
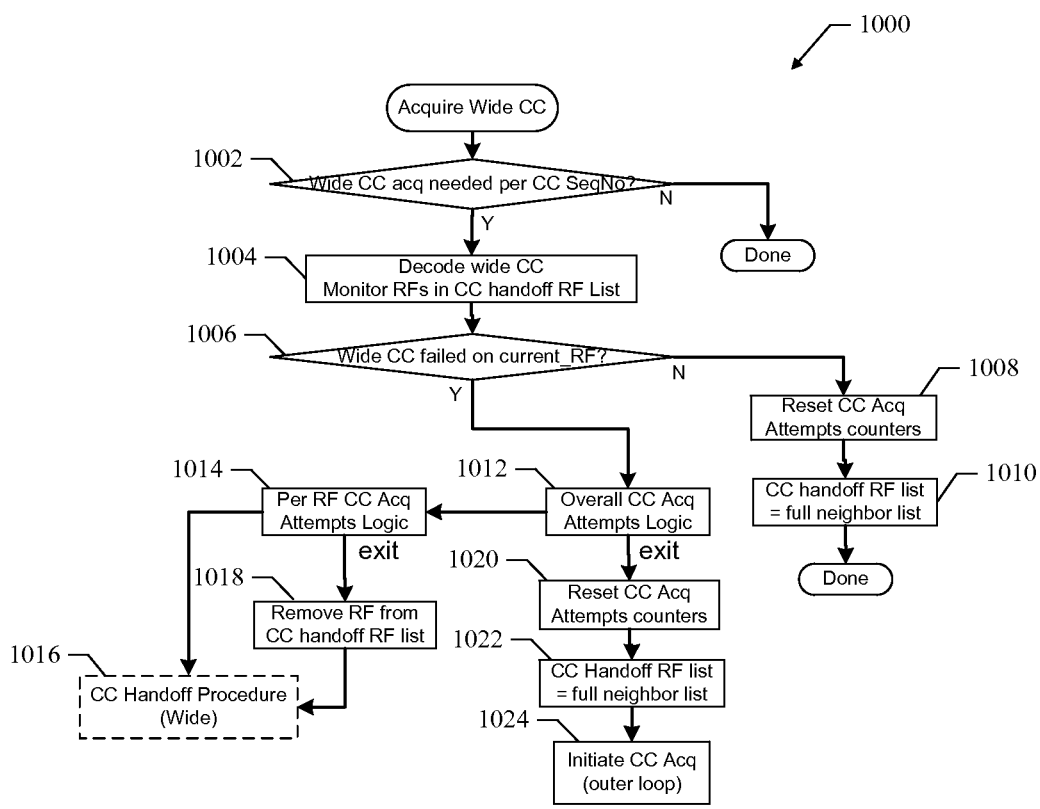
FIG. 10 shows a method for performing a wide control channel acquisition procedure for use in aspects of a service acquisition system.

At block 936, a wide control channel acquisition is performed to attempt to acquire the wide CC. The wide CC acquisition procedure is performed as shown in FIG. 10.

At block 938, the result of the wide and local system acquisition is WOIS and LOIS success, indicating that both wide and local OIS are acquired on the current RF. The method proceeds to block 940.

At block 940, a wide and local control channel acquisition is performed as shown in FIG. 8.

Thus, the method 900 operates to perform a wide+local control channel handoff procedure to attempt to acquire wide and local CC's on RFs available in a multi-frequency network for use in aspects of a service acquisition system. It should be noted that the method 900 represents just one implementation and that other implementations are possible within the scope of the aspects.

FIG. 10 shows a method 1000 for performing a wide control channel acquisition procedure for use in aspects of a service acquisition system. For example, the method 1000 is suitable for use at block 936 of the method 900 and at block 822 of method 800. For clarity, the method 1000 is described herein with reference to the service acquisition logic 300 shown in FIG. 3. For example, in an aspect, the processing logic 302 executes one or more sets of codes to control the service acquisition logic 300 to perform the functions described below.

At block 1002, a determination is made as to whether it is necessary to acquire the wide control channel. In an aspect, the processing logic 302 makes this determination by evaluating a wide control channel sequence number received in the OIS that indicates whether or not an associated wide control channel has been updated. If the wide control channel has been updated and it is necessary to acquire the new wide control channel data, the method proceeds to block 1004. If the wide control channel has not been updated, the method ends.

At block 1004, the wide control channel data is acquired. In an aspect, the overhead input logic 306 operates to acquire the wide control channel data. While acquiring the CC on the current RF, the device also monitors other RFs in the CC handoff RF list to measure their signal strength (RSSI). The device measures RSSI of other RFs during gaps of idle time when decoding CC MLCs on the current RF. The CC handoff RF list is initiated to all RFs available in the current LOI and neighboring LOIs.

At block 1006, a determination is made as to whether the acquisition of the wide channel on the current_RF has failed. If acquisition of the wide control channel has not failed, the method proceeds to block 1008. If the acquisition of the wide control channel has failed, the method proceeds to block 1012.

At block 1008, control channel acquisition attempts counters are reset. In an aspect, two control channel acquisition attempts counters are utilized to count the number of overall and per RF control channel acquisition attempts, respectively. These counters are provided and maintained by the processing logic 302.

At block 1010, the CC handoff RF list is set to the full neighbor RF list which includes RFs in current LOI and its neighboring LOIs. The method then ends.

At block 1012, a determination is made as to whether an 'overall CC acquisition attempts' value has been reached. The overall CC acquisition attempts value defines the number of times the CC acquisition should be attempted over all RFs in the multi-frequency network. For example, in an aspect, the processing logic 302 compares the overall CC acquisition attempts counter to the overall CC acquisition attempts value to make this determination. If the overall CC acquisition attempts value has not been reached, the method proceeds to block 1014. If the overall CC acquisition attempts value has been reached (exit path), the method proceeds to block 1020.

At block 1014, a determination is made as to whether a 'Per RF CC acquisition attempts' value has been reached for the current RF. The Per RF CC acquisition attempts value defines the number of times the CC acquisition should be attempted consecutively on a given RF. For example, in an aspect, the processing logic 302 compares the Per RF CC acquisition attempts counter to the Per RF CC acquisition attempts value to make this determination. If the Per RF CC acquisition attempts value has not been reached for current RF, the method proceeds to block 1016. If the 'Per RF CC acquisition attempts value has been reached (exit path) for current RF, the method proceeds to block 1018.

At block 1016, a wide control channel handoff procedure is performed to attempt to acquire the wide CC on the set of RFs in the CC handoff RF list.

At block 1018, the current RF is removed from the CC handoff RF list and the method then proceeds to block 1016 to attempt to acquire the CC on other RFs in the CC handoff RF list.

At block 1020, control channel acquisition attempts counters are reset. In an aspect, two control channel acquisition attempts counters are utilized to count the number of overall and per RF control channel acquisition attempts, respectively. These counters are provided and maintained by the processing logic 302.

At block 1022, the CC handoff RF list is set to equal the full neighbor RF list which includes RFs in current LOI and its neighboring LOIs.

At block 1024, a CC acquisition outer loop procedure is initiated. As part of the CC acquisition outer loop procedure, the CC acquisition is attempted based on a periodic outer loop timer.

Thus, the method 1000 operates to perform a wide control channel acquisition procedure for use in aspects of a service acquisition system. It should be noted that the method 1000 represents just one implementation and that other implementations are possible within the scope of the aspects.

Figure 11:
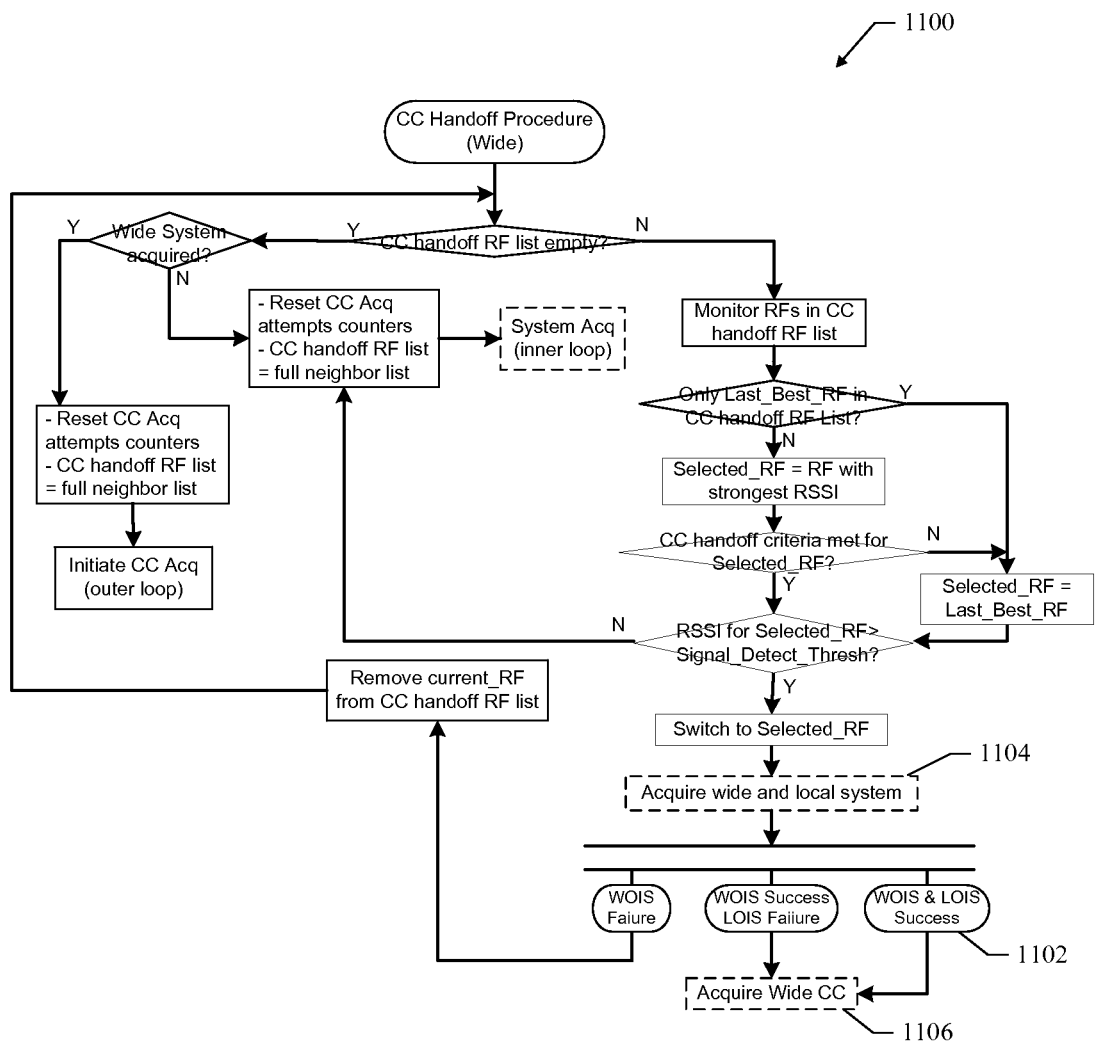
FIG. 11 shows a method for performing a wide control channel handoff procedure for use in aspects of a service acquisition system.

FIG. 11 shows a method 1100 for performing a wide control channel handoff procedure for use in aspects of a service acquisition system. For example, the method 1100 is suitable for use at block 1016 of the method 1000. For clarity, the method 1100 is described herein with reference to the service acquisition logic 300 shown in FIG. 3. For example, in an aspect, the processing logic 302 executes one or more sets of codes to control the service acquisition logic 300 to perform the functions described below. It should be noted that the method 1100 is similar to the method 900 and therefore only those operations that are different from the method 900 are described below.

At block 1102, the result of the wide and local system acquisition (performed at block 1104) is WOIS success and LOIS failure, indicating that the wide OIS is acquired on the current RF and the local OIS is not acquired on the current RF. The method then proceeds to block 1106 where a wide CC acquisition is performed to attempt to acquire wide CC as described with reference to the method 1000.

Thus, the method 1100 operates to perform a wide control channel handoff procedure for use in aspects of a service acquisition system. It should be noted that the method 1100 represents just one implementation and that other implementations are possible within the scope of the aspects.

Figure 12:
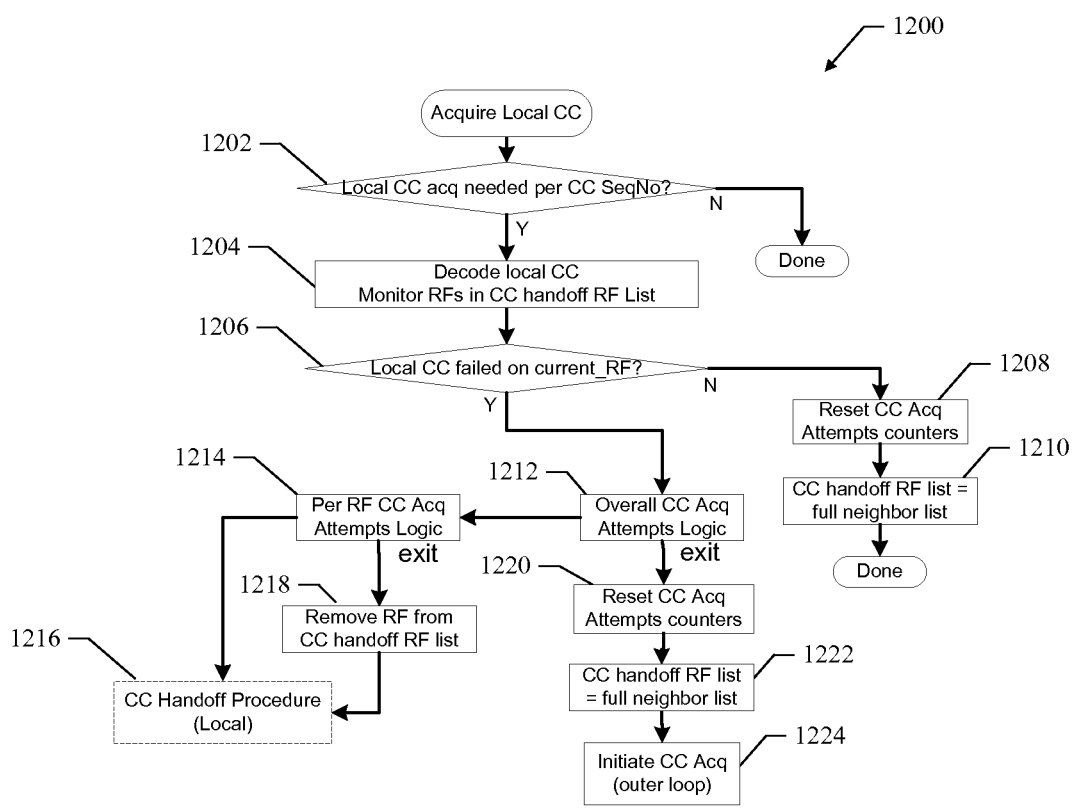
FIG. 12 shows a method for performing a local control channel acquisition procedure for use in aspects of a service acquisition system.

FIG. 12 shows a method 1200 for performing a local control channel acquisition procedure for use in aspects of a service acquisition system. For example, the method 1200 is suitable for use at block 820 of the method 800. For clarity, the method 1200 is described herein with reference to the service acquisition logic 300 shown in FIG. 3. For example, in an aspect, the processing logic 302 executes one or more sets of codes to control the service acquisition logic 300 to perform the functions described below.

At block 1202, a determination is made as to whether it is necessary to acquire the local control channel. In an aspect, the processing logic 302 makes this determination by evaluating a local control channel sequence number received in the OIS that indicates whether or not an associated local control channel has been updated. If the local control channel has been updated and it is necessary to acquire the new local control channel data, the method proceeds to block 1204. If the local control channel has not been updated, the method ends.

At block 1204, the local control channel data is acquired. In an aspect, the overhead input logic 306 operates to acquire the local control channel data. While acquiring the CC on the current RF, the device also monitors other RFs in the CC handoff RF list to measure their signal strength (RSSI). The device measures RSSI of other RFs during gaps of idle time when decoding CC MLCs on the current RF. The CC handoff RF list is initiated to all RFs available in the current LOI and neighboring LOIs.

At block 1206, a determination is made as to whether the acquisition of the local channel on the current_RF has failed. If acquisition of the local control channel has not failed, the method proceeds to block 1208. If the acquisition of the local control channel has failed, the method proceeds to block 1212.

At block 1208, control channel acquisition attempts counters are reset. In an aspect, two control channel acquisition attempts counters are utilized to count the number of overall and per RF control channel acquisition attempts, respectively. These counters are provided and maintained by the processing logic 302.

At block 1210, the CC handoff RF list is set to the full neighbor RF list which includes RFs in current LOI and its neighboring LOIs. The method then ends.

At block 1212, a determination is made as to whether an 'overall CC acquisition attempts' value has been reached. The overall CC acquisition attempts value defines the number of times the CC acquisition should be attempted over all RFs in the multi-frequency network. For example, in an aspect, the processing logic 302 compares the overall CC acquisition attempts counter to the overall CC acquisition attempts value to make this determination. If the overall CC acquisition attempts value has not been reached, the method proceeds to block 1214. If the overall CC acquisition attempts value has been reached (exit path), the method proceeds to block 1220.

At block 1214, a determination is made as to whether a 'Per RF CC acquisition attempts' value has been reached for the current RF. The Per RF CC acquisition attempts value defines the number of times the CC acquisition should be attempted consecutively on a given RF. For example, in an aspect, the processing logic 302 compares the Per RF CC acquisition attempts counter to the Per RF CC acquisition attempts value to make this determination. If the Per RF CC acquisition attempts value has not been reached for current RF, the method proceeds to block 1216. If the Per RF CC acquisition attempts value has been reached (exit path) for current RF, the method proceeds to block 1218.

At block 1216, a local control channel handoff procedure is performed to attempt to acquire the local CC on the set of RFs in the CC handoff RF list.

At block 1218, the current RF is removed from the CC handoff RF list and the method then proceeds to block 1216 to attempt to acquire the local CC on other RFs in the CC handoff RF list.

At block 1220, control channel acquisition attempts counters are reset. In an aspect, two control channel acquisition attempts counters are utilized to count the number of overall and per RF control channel acquisition attempts, respectively. These counters are provided and maintained by the processing logic 302.

At block 1222, the CC handoff RF list is set to equal the full neighbor RF list which includes RFs in current LOI and its neighboring LOIs.

At block 1224, a CC acquisition outer loop procedure is initiated. As part of the CC acquisition outer loop procedure, the CC acquisition is attempted based on a periodic outer loop timer.

Thus, the method 1200 operates to perform a local control channel acquisition procedure for use in aspects of a service acquisition system. It should be noted that the method 1200 represents just one implementation and that other implementations are possible within the scope of the aspects.

Figure 13:
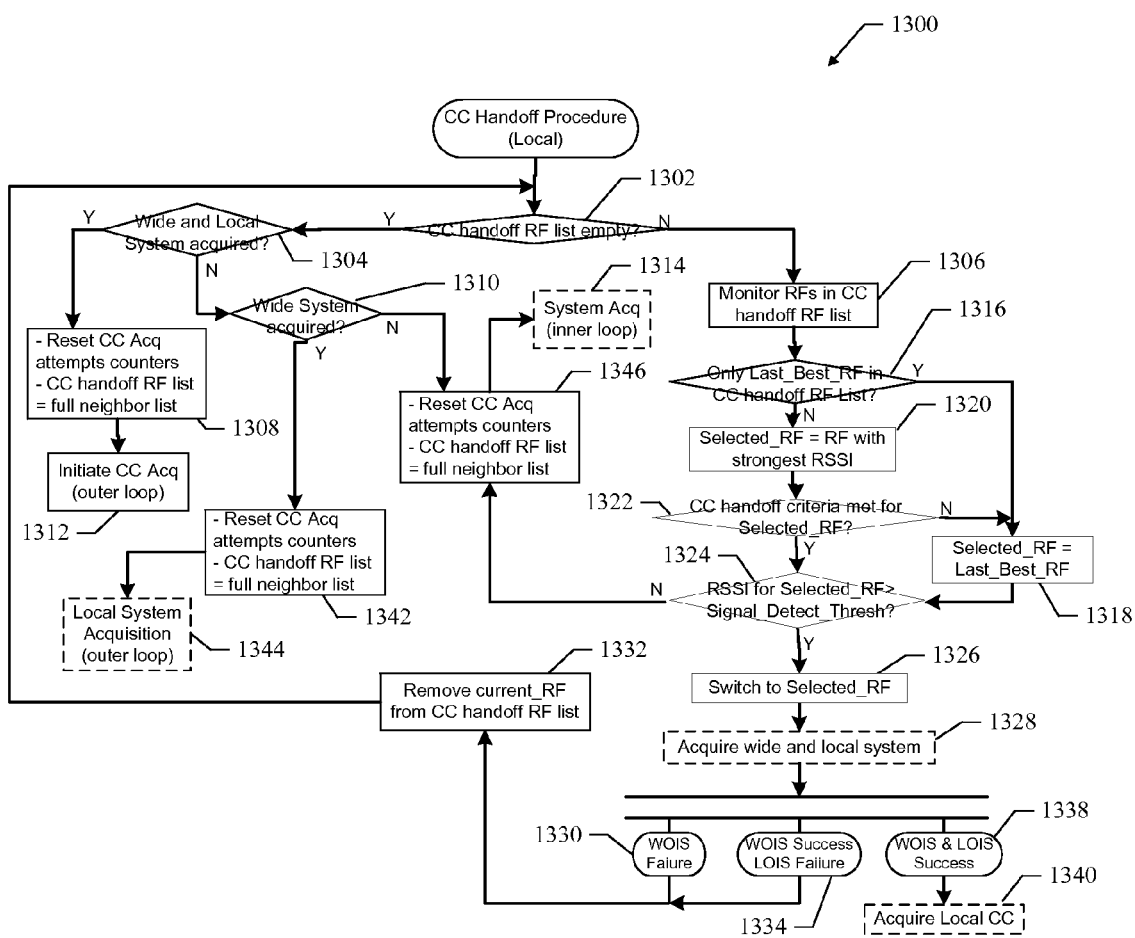
FIG. 13 shows a method for performing a local control channel handoff procedure for use in aspects of a service acquisition system.

FIG. 13 shows a method 1300 for performing a local control channel handoff procedure for use in aspects of a service acquisition system. For example, the method 1300 is suitable for use at block 1216 of the method 1200. For clarity, the method 1300 is described herein with reference to the service acquisition logic 300 shown in FIG. 3. For example, in an aspect, the processing logic 302 executes one or more sets of codes to control the service acquisition logic 300 to perform the functions described below.

At block 1302, a determination is made as to whether a CC handoff RF list is empty. In an aspect, the processing logic 302 makes this determination. If the CC handoff RF list is empty, the method proceeds to block 1304. If the CC handoff RF list is not empty, the method proceeds to block 1306.

At block 1304, a determination is made as to whether the wide and local system is acquired on the current RF. In an aspect, the processing logic 302 makes this determination. If the wide and local system is acquired on current RF, the method proceeds to block 1308. If the wide and local system is not acquired on the current RF, the method proceeds to block 1310.

At block 1308, control channel acquisition attempts counters are reset. In an aspect, two control channel acquisition attempts counters are utilized to count the number of overall and per RF control channel acquisition attempts, respectively. These counters are provided and maintained by the processing logic 302. The CC handoff RF list is set equal to the full neighbor RF list. In an aspect, the processing logic 302 performs these functions.

At block 1312, a control channel acquisition outer loop procedure is initiated. As part of the CC acquisition outer loop procedure, the CC acquisition is attempted based on a periodic outer loop timer.

At block 1310, a determination is made as to whether the wide system has been acquired on the current RF. If the wide system has not been acquired, the method proceeds to block 1346. If the wide system has been acquired, the method proceeds to block 1342.

At block 1342, control channel acquisition attempts counters are reset. In an aspect, two control channel acquisition attempts counters are utilized to count the number of overall and per RF control channel acquisition attempts, respectively. These counters are provided and maintained by the processing logic 302. The CC handoff RF list is set equal to the full neighbor RF list. In an aspect, the processing logic 302 performs these functions.

At block 1344, a local system acquisition (outer loop) is initiated as described with respect to the method 600 shown FIG. 6.

At block 1346, control channel acquisition attempts counters are reset. In an aspect, two control channel acquisition attempts counters are utilized to count the number of overall and per RF control channel acquisition attempts, respectively. These counters are provided and maintained by the processing logic 302. The CC handoff RF list is set equal to the full neighbor RF list. In an aspect, the processing logic 302 performs these functions.

At block 1314, a system acquisition inner loop is performed as described in the method 400 shown in FIG. 4.

At block 1306, RFs in the CC Handoff RF list are monitored to measure signal strength for these RFs.

At block 1316, a determination is made as to whether the Last_Best_RF is the only RF identified in the CC handoff RF list. If the Last_Best_RF is the only RF identified in the CC handoff RF list, the method proceeds to block 1318. If Last_Best_RF is not the only RF identified in the CC handoff RF list, the method proceeds to block 1320.

At block 1320, the RF with the strongest RSSI in the CC handoff RF list is selected as the Selected_RF. In an aspect, the processing logic 302 makes this selection.

At block 1322, a determination is made as to whether control channel handoff criteria have been met for the Selected_RF. For example, the handoff criteria determines if (RSSI (Selected_RF))>RSSI(Last_Best_RF)+CC_Hys) is satisfied for the Selected_RF, where CC_Hys is a RSSI hysteresis value. If the CC handoff criteria have been met, the method proceeds to block 1324. If the CC handoff criteria have not been met, the method proceeds to block 1318.

At block 1324, a determination is made as to whether the signal strength for the Selected_RF is greater than a signal detection threshold. If the signal strength is greater than the signal detection threshold, the method proceeds to block 1326. If the signal strength is less or equal to the signal detection threshold, the method proceeds to block 1346.

At block 1318, the Selected_RF is set to be the Last_Best_RF.

At block 1326, a RF channel switch to the Selected_RF is performed.

At block 1328, the wide and local system acquisition procedure is performed as described with reference to the method 500 shown in FIG. 5.

At block 1330, the result of the wide and local system acquisition is WOIS failure, indicating that the wide OIS is not acquired on the current RF. The method proceeds to block 1332.

At block 1332, the current_RF is removed from the CC handoff RF list because the wide OIS failed on the current RF. The method proceeds to block 1302.

At block 1334, the result of the wide and local system acquisition is WOIS success and LOIS failure, indicating that the wide OIS is acquired on the current RF and the local OIS is not acquired on the current RF. The method proceeds to block 1332.

At block 1338, the result of the wide and local system acquisition is WOIS and LOIS success, indicating that both wide and local OIS are acquired on the current RF. The method proceeds to block 1340.

At block 1340, a local control channel acquisition is performed as described with reference to the method 1200 in FIG. 12.

Thus, the method 1300 operates to perform a local control channel handoff procedure for use in aspects of a service acquisition system. It should be noted that the method 1300 represents just one implementation and that other implementations are possible within the scope of the aspects.

System Acquisition Outer Loop

The system acquisition outer loop is executed to recover from periods of extended loss of system coverage. The system acquisition outer loop is executed if the system does not get acquired as part of the system acquisition inner loop as provided at block 422 shown in FIG. 4. The system acquisition outer-loop comprises multiple attempts of the system acquisition inner loop algorithm described by method 400 in FIG. 4. The system acquisition inner loop attempts are executed based on an outer loop retry schedule as part of the system acquisition outer-loop. In an aspect, the first system acquisition inner loop attempt runs first with the NDM RF List (if available) and then with the PP RF List if the system does not get acquired using the NDM RF List. The first system acquisition inner loop attempt runs long enough to check if the device is in coverage, which may be long enough to account for deep-shadow fading transmission conditions. Subsequent system acquisition inner loop attempt runs for a shorter duration to save battery power. Separate Service_Acquisition_Timer values are used for the first inner loop attempt and subsequent inner loop attempts. For example, the first inner loop attempt may utilize First_System_Acq_Timer with a default value of twenty seconds. The subsequent inner loop attempts may utilize a Subsequent_System_Acq_Timer with a default value of five seconds.

OIS Monitoring

In various aspects, the system monitors OIS information even when no flows are requested from the upper layer (idle state). The OIS monitoring is done so that the system acquires any updates to overhead information (OIS and CC). The system monitors OIS based on an OIS monitor schedule. For example, the system may monitor OIS periodically. As part of acquiring OIS on current RF, the system measures the signal strength (RSSI) of the current RF. The system attempts to acquire the WOIS and LOIS on the current RF. If the WOIS fails, a system acquisition inner loop is initiated. If the WOIS succeeds and the LOIS fails, a local system acquisition (outer loop) is initiated. If both WOIS and LOIS are successful, then control channel data is acquired if needed based on the received control channel sequence number. If WOIS and LOIS succeeds but RSSI of current RF is below an OIS_Monitor_Thresh, then the neighboring RFs are monitored once to measure their RSSI. If one or more of the neighboring RFs have stronger RSSI than current RF, the system performs an RF switch to the neighboring RF with strongest RSSI. This ensures that if the current RF does not have the strongest RSSI, a better RF is selected during OIS monitoring. Thus, data decoding for upper layer requested flows (when initiated) is less likely to fail on current RF.

Figure 14:
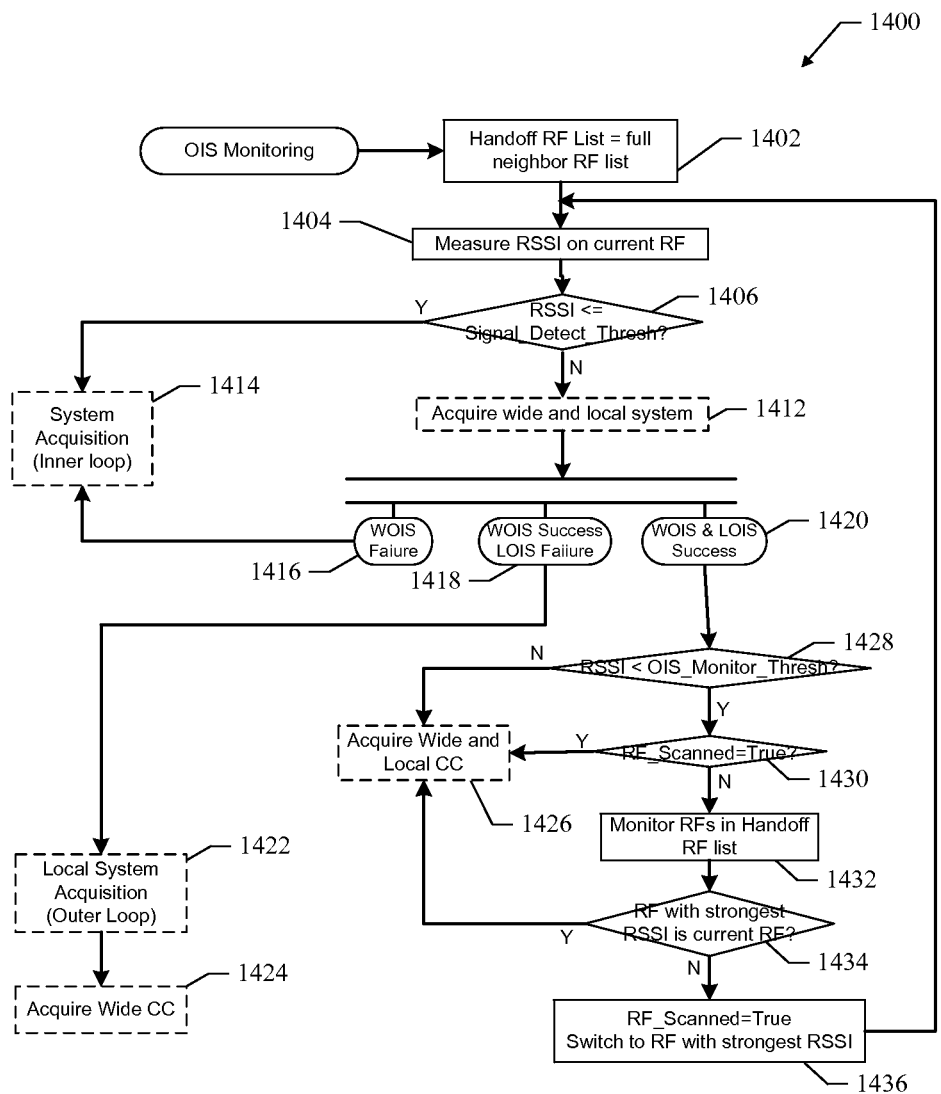
FIG. 14 shows a method for a periodic OIS monitoring for use in aspects of a service reacquisition system.

FIG. 14 shows a method 1400 for OIS monitoring for use in aspects of a service acquisition system. For clarity, the method 1400 is described herein with reference to the service acquisition logic 300 shown in FIG. 3. For example, in an aspect, the processing logic 302 executes one or more sets of codes to control the service acquisition logic 300 to perform the functions described below.

At block 1402, a Handoff RF list is set to equal the full neighbor RF list which includes RFs in current LOI and its neighboring LOs.

At block 1404, the signal strength of the current RF is measured.

At block 1406, a determination is made as to whether the signal strength of the current RF is less than or equal to a signal detection threshold. If the RSSI of the current RF is less than or equal to the signal detection threshold, the method proceeds to block 1414. If the RSSI of current RF is greater than the signal detection threshold, the method proceeds to block 1412.

At block 1412, the wide and local system acquisition procedure is performed as described with reference to the method 500 shown in FIG. 5.

At block 1416, the result of the wide and local system acquisition is WOIS failure, indicating that the wide OIS is not acquired on the current RF. The method proceeds to block 1414.

At block 1414, a system acquisition inner loop is performed as described with reference to the method 400 shown FIG. 4.

At block 1418, the result of the wide and local system acquisition is WOIS success and LOIS failure, indicating that the wide OIS is acquired on the current RF and the local OIS is not acquired on the current RF. The method proceeds to block 1422.

At block 1422, a local system acquisition outer loop procedure is executed as described with reference to the method 600 shown in FIG. 6.

At block 1424, a wide control channel acquisition is performed to attempt to acquire wide CC. The wide CC acquisition procedure is described with reference to the method 1000 shown in FIG. 10.

At block 1420, the result of the wide and local system acquisition is WOIS and LOIS success, indicating that both wide and local OIS are acquired on the current RF. The method proceeds to block 1428.

At block 1428, a determination is made as to whether the signal strength of the current RF is less that an OIS monitor threshold. If it is less, the method proceeds to block 1430. If it is not less, the method proceeds to block 1426.

At block 1430, a determination is made as to whether the RF_Scanned flag is true. A 'true' value for RF_Scanned flag indicates that neighboring RFs have been scanned once for the purpose to select the best RF to acquire the system. If RF_Scanned is true, the method proceeds to block 1426 to acquire wide and local CC on current RF. If RF_Scanned is not true, the method proceeds to block 1432.

At block 1432, the RFs in the Handoff RF list are monitored to measure signal strength for these RFs.

At block 1434, a determination is made as to whether the RF with the strongest signal strength is the current RF. If it is the current RF, the method proceeds to block 1426. If it is not the current RF, the method proceeds to block 1436.

At block 1436, RF_Scanned flag is set to true and an RF switch is made to the RF channel with the strongest signal strength. The method then proceeds to block 1404.

At block 1426, a wide and local control channel acquisition is performed to attempt to acquire wide and local CC. The wide and local CC acquisition procedure is described with reference to the method 800 shown in FIG. 8.

Thus, the method 1400 operates to perform a OIS monitoring procedure for use in aspects of a service acquisition system. It should be noted that the method 1400 represents just one implementation and that other implementations are possible within the scope of the aspects.

Figure 15:
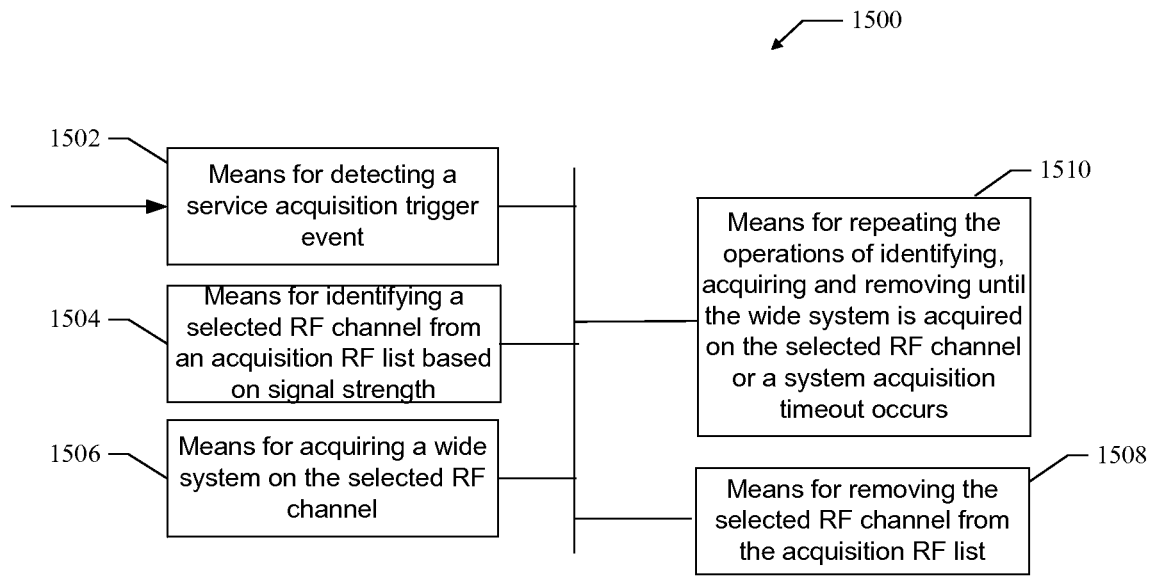
FIG. 15 shows service acquisition logic for use in aspects of a service acquisition system.

FIG. 15 shows service acquisition logic 1500 for use in aspects of a service acquisition system. For example, the service acquisition logic 1500 is suitable for use as the service acquisition logic 118 shown in FIG. 1. In an aspect, the service acquisition logic 1500 is implemented by at least one integrated circuit comprising one or more modules configured to provide aspects of a service acquisition system as described herein. For example, in an aspect, each module comprises hardware and/or hardware executing software.

The service acquisition logic 1500 comprises a first module comprising means (1502) for detecting a service acquisition trigger event, which in an aspect comprises the processing logic 302. The service acquisition logic 1500 also comprises a second module comprising means (1504) for identifying a selected RF channel from an acquisition RF list based on signal strength, wherein the acquisition RF list identifies RF channels in one or more local operations infrastructures (LOIs) of the multi-frequency network, which in an aspect comprises the processing logic 302. The service acquisition logic 1500 also comprises a third module comprising means (1506) for acquiring a wide system on the selected RF channel, which in an aspect comprises the processing logic 302. The service acquisition logic 1500 also comprises a fourth module comprising means (1508) for removing the selected RF channel from the acquisition RF list if the wide system can not be acquired on the selected RF channel, which in an aspect comprises the processing logic 302. The service acquisition logic 1500 also comprises a fifth module comprising means (1510) for repeating the operations of identifying, acquiring and removing until the wide system is acquired on the selected RF channel or a system acquisition timeout occurs, which in an aspect comprises the processing logic 302.

Figure 16:
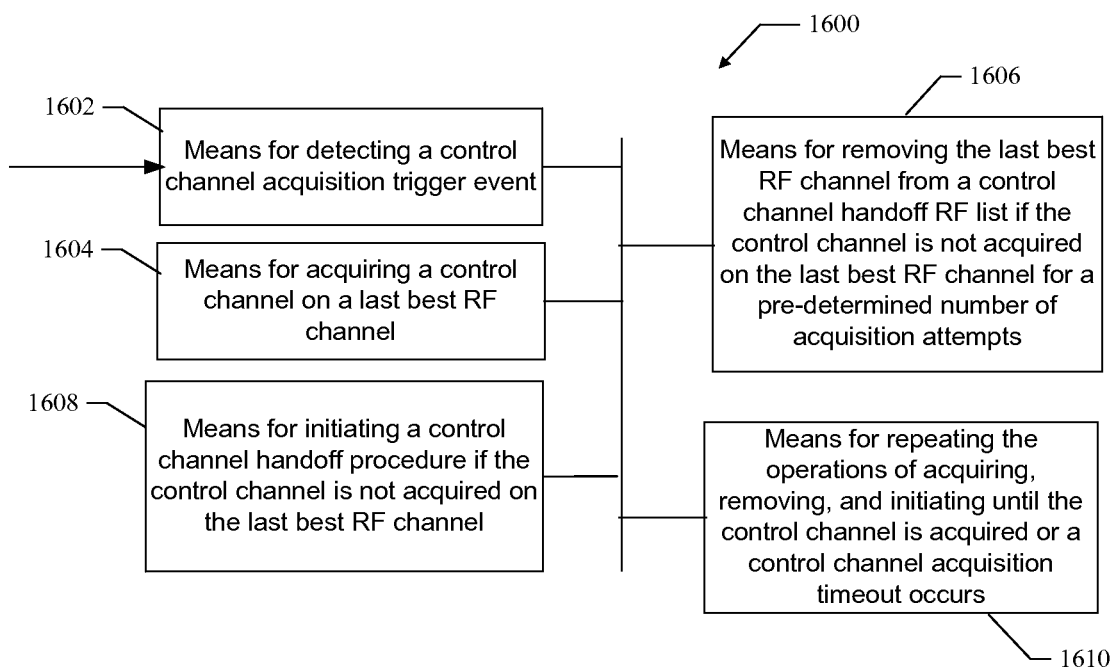
FIG. 16 shows service acquisition logic for use in aspects of a service acquisition system.

FIG. 16 shows service acquisition logic 1600 for use in aspects of a service acquisition system. For example, the service acquisition logic 1600 is suitable for use as the service acquisition logic 118 shown in FIG. 1. In an aspect, the service acquisition logic 1600 is implemented by at least one integrated circuit comprising one or more modules configured to provide aspects of a service acquisition system as described herein. For example, in an aspect, each module comprises hardware and/or hardware executing software.

The service acquisition logic 1600 comprises a first module comprising means (1602) for detecting a control channel acquisition trigger event, which in an aspect comprises the processing logic 302. The service acquisition logic 1600 also comprises a second module comprising means (1604) for acquiring a control channel on a last best RF channel, which in an aspect comprises the processing logic 302. The service acquisition logic 1600 also comprises a third module comprising means (1606) for removing the last best RF channel from a control channel handoff RF list if the control channel is not acquired on the last best RF channel for a pre-determined number of acquisition attempts, which in an aspect comprises the processing logic 302. The service acquisition logic 1600 also comprises a fourth module comprising means (1608) for initiating a control channel handoff procedure if the control channel is not acquired on the last best RF channel, which in an aspect comprises the processing logic 302. The service acquisition logic 1600 also comprises a fifth module comprising means (1610) for repeating the operations of acquiring, removing, and initiating until the control channel is acquired or a control channel acquisition timeout occurs, which in an aspect comprises the processing logic 302.

Figure 17:
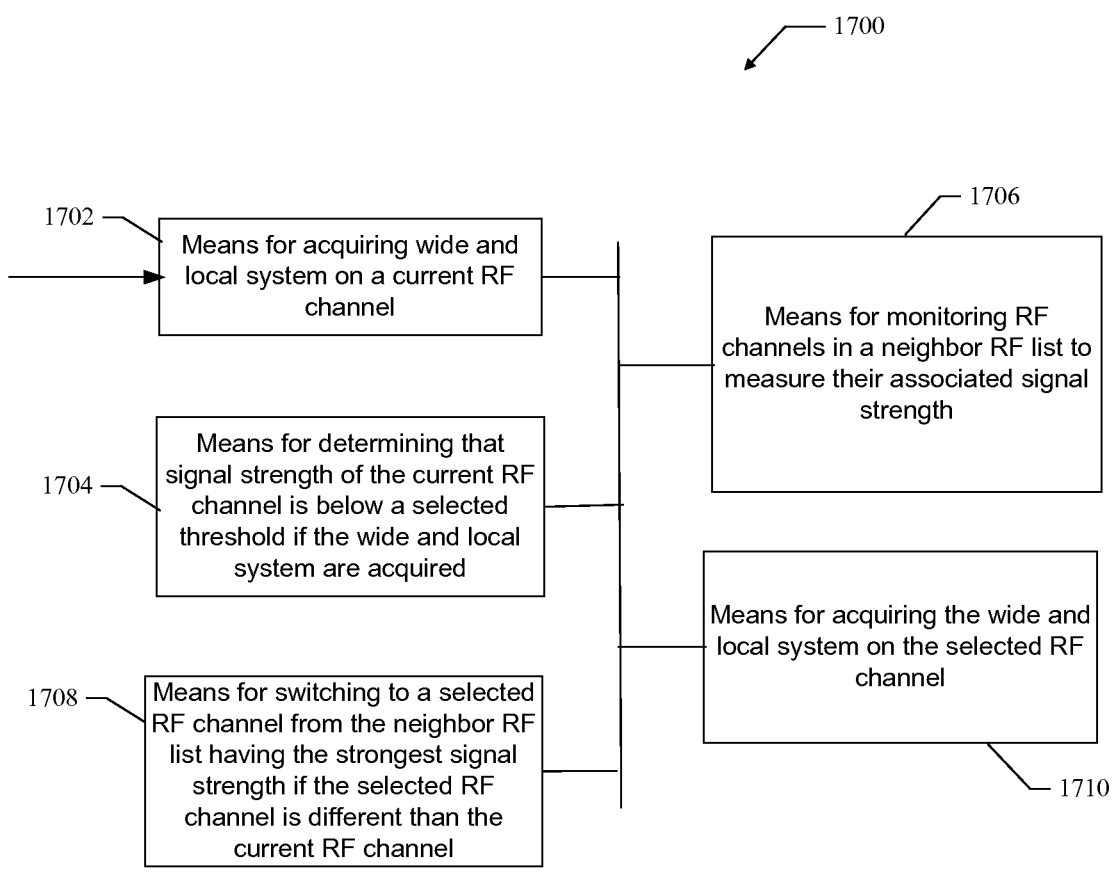
FIG. 17 shows service acquisition logic for use in aspects of a service acquisition system.

FIG. 17 shows service acquisition logic 1700 for use in aspects of a service acquisition system. For example, the service acquisition logic 1700 is suitable for use as the service acquisition logic 118 shown in FIG. 1. In an aspect, the service acquisition logic 1700 is implemented by at least one integrated circuit comprising one or more modules configured to provide aspects of a service acquisition system as described herein. For example, in an aspect, each module comprises hardware and/or hardware executing software.

The service acquisition logic 1700 comprises a first module comprising means (1702) for acquiring wide and local system on a current RF channel, which in an aspect comprises the processing logic 302. The service acquisition logic 1700 also comprises a second module comprising means (1704) for determining that signal strength of the current RF channel is below a selected threshold if the wide and local system are acquired, which in an aspect comprises the processing logic 302. The service acquisition logic 1700 also comprises a third module comprising means (1706) for monitoring RF channels in a neighbor RF list to measure their associated signal strength, which in an aspect comprises the processing logic 302. The service acquisition logic 1700 also comprises a fourth module comprising means (1708) for switching to a selected RF channel from the neighbor RF list having the strongest signal strength if the selected RF channel is different than the current RF channel, which in an aspect comprises the processing logic 302. The service acquisition logic 1700 also comprises a fifth module comprising means (1710) for acquiring the wide and local system on the selected RF channel, which in an aspect comprises the processing logic 302.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed aspects is provided to enable any person skilled in the art to make or use the present invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while aspects of a network service acquisition system have been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

What is claimed is:

1. A method for service acquisition in a multi-frequency network, the method comprising:
    detecting a service acquisition trigger event;
    identifying a single selected RF channel from an acquisition RF list based on signal strength, wherein the acquisition RF list identifies RF channels in one or more local operations infrastructures (LOIs) of the multi-frequency network;
    attempting to acquire a wide system on the single selected RF channel;
    removing the single selected RF channel from the acquisition RF list if the wide system cannot be acquired on the single selected RF channel; and
    repeating said operations of identifying, attempting, and removing until the wide system is acquired on the single selected RF channel or a system acquisition timeout occurs.

2. The method of claim 1, further comprising obtaining the acquisition RF list from at least one of a pre-provisioned RF list and a neighbor RF list determined from neighbor description information.

3. The method of claim 1, wherein said detecting comprises detecting the service acquisition trigger event based on at least one of: a power-up condition; detection of system loss; a content acquisition request; and a scheduled system acquisition attempt.

4. The method of claim 1, further comprising monitoring the RF channels in the acquisition RF list to measure their associated signal strength.

5. The method of claim 1, wherein said identifying comprises identifying the single selected RF channel to be an RF channel in the acquisition RF list having the strongest signal strength above a signal detection threshold.

6. The method of claim 1, wherein said repeating comprises repeating said operations of identifying, attempting, and removing for RF channels in the acquisition RF list for which signal strength is above a signal detection threshold.

7. The method of claim 1, further comprising acquiring a wide control channel on the single selected RF channel if the wide system is acquired.

8. The method of claim 7, further comprising acquiring the wide control channel based on a wide control channel acquisition retry schedule if the wide control channel is not acquired in a first acquisition attempt.

9. The method of claim 1, further comprising:
    attempting to acquire a local system on the single selected RF channel; and
    acquiring a local control channel on the single selected RF channel if the local system is acquired.

10. The method of claim 9, further comprising acquiring the local control channel based on a local control channel acquisition retry schedule if the local control channel is not acquired in a first acquisition attempt.

11. The method of claim 9, further comprising initiating a local system acquisition procedure if the local system is not acquired.

12. The method of claim 11, wherein said initiating comprises initiating the local system acquisition procedure to acquire the local system on the single selected RF channel based on a local system acquisition retry schedule.

13. The method of claim 12, wherein said initiating comprises setting the local system acquisition retry schedule to include an exponential back-off phase followed by a periodic reattempt phase.

14. The method of claim 11, wherein said initiating the local system acquisition procedure comprises:
    identifying a local selected RF channel to be a last best RF channel from the local acquisition RF list if signal strength for the last best RF channel is above a local signal detection threshold;

identifying a local selected RF channel to be an RF channel from the local acquisition RF list with the strongest signal strength if signal strength of the last best RF channel is equal to or below the local signal detection threshold;

attempting to acquire the local system on the local selected RF channel;

removing the local selected RF channel from local acquisition RF list if the local system is not acquired on the local selected RF channel; and repeating said operations of identifying the local selected RF channel, attempting to acquire the local system, and removing the local selected RF channel, until the local system is acquired on the local selected RF channel or a local system acquisition timeout occurs.

15. The method of claim 14, further comprising obtaining the local acquisition RF list from at least one of a pre-provisioned RF list and a neighbor RF list determined from neighbor description information.

16. The method of claim 14, further comprising monitoring the RF channels in the local acquisition RF list to measure their associated signal strength.

17. The method of claim 14, further comprising determining the last best RF to be an RF channel where the wide system was last acquired.

18. The method of claim 14, further comprising initiating a local system acquisition outer loop if the local system is not acquired.

19. The method of claim 18, further comprising attempting to acquire the local system based on a pre-determined local outer loop schedule as part of the local system acquisition outer loop.

20. The method of claim 1, further comprising initiating a system acquisition outer loop if the wide system is not acquired.

21. The method of claim 20, further comprising attempting to acquire the wide system based on a pre-determined outer loop schedule as part of the system acquisition outer loop.

22. An apparatus for service acquisition in a multi-frequency network, the apparatus comprising:
a processor configured with processor-executable instructions to perform operations comprising:
detecting a service acquisition trigger event;
identifying a single selected RF channel from an acquisition RF list based on signal strength, wherein the acquisition RF list identifies RF channels in one or more local operations infrastructures (LOIs) of the multi-frequency network;
attempting to acquire a wide system on the single selected RF channel;
removing the single selected RF channel from the acquisition RF list if the wide system can not be acquired on the single selected RF channel; and
repeating said operations of identifying, attempting, acquiring and removing until the wide system is acquired on the single selected RF channel or a system acquisition timeout occurs.

23. The apparatus of claim 22, wherein the processor is configured with processor-executable instructions to perform operations further comprising obtaining the acquisition RF list from at least one of a pre-provisioned RF list and a neighbor RF list determined from neighbor description information.

24. The apparatus of claim 22, wherein the processor is configured with processor-executable instructions to perform operations further comprising detecting the service acquisition trigger event based on at least one of: a power-up condition; detection of system loss; a content acquisition request; and a scheduled system acquisition attempt.

25. The apparatus of claim 22, wherein the processor is configured with processor-executable instructions to perform operations further comprising repeating said operations of identifying, attempting, and removing for RF channels in the acquisition RF list for which signal strength is above a signal detection threshold.

26. The apparatus of claim 22, wherein said processing logic the processor is configured with processor-executable instructions to perform operations further comprising:
attempting to acquire a local system on the single selected RF channel; and
acquiring a local control channel on the single selected RF channel if the local system is acquired.

27. The apparatus of claim 22, wherein the processor is configured with processor-executable instructions to perform operations further comprising initiating a local system acquisition procedure if the local system is not acquired.

28. The apparatus of claim 22, wherein the processor is configured with processor-executable instructions to perform operations further comprising initiating the local system acquisition procedure to acquire the local system on the single selected RF channel based on a local system acquisition retry schedule.

29. The apparatus of claim 27, wherein the processor is configured with processor-executable instructions to perform operations further comprising:
identifying a local selected RF channel to be a last best RF channel from the local acquisition RF list if signal strength for the last best RF channel is above a local signal detection threshold;
identifying a local selected RF channel to be an RF channel from the local acquisition RF list with the strongest signal strength if signal strength of the last best RF channel is equal to or below the local signal detection threshold;
attempting to acquire the local system on the local selected RF channel;
removing the local selected RF channel from local acquisition RF list if the local system is not acquired on the local selected RF channel; and
repeating said operations of identifying the local selected RF channel, attempting to acquire acquiring the local system, and removing the local selected RF channel, until the local system is acquired on the local selected RF channel or a local system acquisition timeout occurs.

30. The apparatus of claim 29, wherein the processor is configured with processor-executable instructions to perform operations further comprising obtaining the local acquisition RF list from at least one of a pre-provisioned RF list and a neighbor RF list determined from neighbor description information.

31. The apparatus of claim 29, wherein the processor is configured with processor-executable instructions to perform operations further comprising initiating a local system acquisition outer loop if the local system is not acquired.

32. The apparatus of claim 22, wherein the processor is configured with processor-executable instructions to perform operations further comprising initiating a system acquisition outer loop if the wide system is not acquired.

33. An apparatus for service acquisition in a multi-frequency network, the apparatus comprising:
means for detecting a service acquisition trigger event;
means for identifying a single selected RF channel from an acquisition RF list based on signal strength, wherein the acquisition RF list identifies RF channels in one or more local operations infrastructures (LOIs) of the multi-frequency network;
means for attempting to acquire a wide system on the single selected RF channel;
means for removing the single selected RF channel from the acquisition RF list if the wide system can not be acquired on the single selected RF channel; and
means for repeating said operations of identifying, attempting, and removing until the wide system is acquired on the single selected RF channel or a system acquisition timeout occurs.

34. The apparatus of claim 33, further comprising means for obtaining the acquisition RF list from at least one of a pre-provisioned RF list and a neighbor RF list determined from neighbor description information.

35. The apparatus of claim 33, wherein said means for detecting comprises means for detecting the service acquisition trigger event based on at least one of: a power-up condition; detection of system loss; a content acquisition request; and a scheduled system acquisition attempt.

36. The apparatus of claim 33, wherein said means for repeating comprises means for repeating said operations of identifying, attempting, and removing for RF channels in the acquisition RF list for which signal strength is above a signal detection threshold.

37. The apparatus of claim 33, further comprising:
means for attempting to acquire a local system on the single selected RF channel; and
means for acquiring a local control channel on the single selected RF channel if the local system is acquired.

38. The apparatus of claim 37, further comprising means for initiating a local system acquisition procedure if the local system is not acquired.

39. The apparatus of claim 38, wherein said means for initiating comprises means for initiating the local system acquisition procedure to acquire the local system on the single selected RF channel based on a local system acquisition retry schedule.

40. The apparatus of claim 38, wherein said means for initiating the local system acquisition procedure comprises:
means for identifying a local selected RF channel to be a last best RF channel from the local acquisition RF list if signal strength for the last best RF channel is above a local signal detection threshold;
means for identifying a local selected RF channel to be an RF channel from the local acquisition RF list with the strongest signal strength if signal strength of the last best RF channel is equal to or below the local signal detection threshold;
means for attempting to acquire the local system on the local selected RF channel;
means for removing the local selected RF channel from local acquisition RF list if the local system is not acquired on the local selected RF channel; and
means for repeating said operations of identifying the local selected RF channel, attempting to acquire the local system, and removing the local selected RF channel until the local system is acquired on the local selected RF channel or a local system acquisition timeout occurs.

41. The apparatus of claim 40, further comprising means for obtaining the local acquisition RF list from at least one of a pre-provisioned RF list and a neighbor RF list determined from neighbor description information.

42. The apparatus of claim 40, further comprising means for initiating a local system acquisition outer loop if the local system is not acquired.

43. The apparatus of claim 33, further comprising means for initiating a system acquisition outer loop if the wide system is not acquired.

44. A non-transitory processor-readable storage medium having stored thereon processor-executable instructions configured to cause a processor to perform operations comprising:
detecting a service acquisition trigger event;
identifying a single selected RF channel from an acquisition RF list based on signal strength, wherein the acquisition RF list identifies RF channels in one or more local operations infrastructures (LOIs) of a multi-frequency network;
attempting to acquire a wide system on the single selected RF channel;
removing the single selected RF channel from the acquisition RF list if the wide system can not be acquired on the single selected RF channel; and
repeating said operations of identifying, attempting, and removing until the wide system is acquired on the single selected RF channel or a system acquisition timeout occurs.

45. The non-transitory processor-readable storage medium of claim 44, wherein the storage medium has stored thereon processor-executable instructions configured to cause a processor to perform operations further comprising obtaining the acquisition RF list from at least one of a pre-provisioned RF list and a neighbor RF list determined from neighbor description information.

46. The non-transitory processor-readable storage medium of claim 44, wherein the storage medium has stored thereon processor-executable instructions configured to cause a processor to perform operations further comprising detecting the service acquisition trigger event based on at least one of: a power-up condition; detection of system loss; a content acquisition request; and a scheduled system acquisition attempt.

47. The non-transitory processor-readable storage medium of claim 44, wherein the storage medium has stored thereon processor-executable instructions configured to cause a processor to perform operations further comprising repeating said operations of identifying, attempting, and removing for RF channels in the acquisition RF list for which signal strength is above a signal detection threshold.

48. The non-transitory processor-readable storage medium of claim 44, wherein the storage medium has stored thereon processor-executable instructions configured to cause a processor to perform operations further comprising:
attempting to acquire a local system on the single selected RF channel; and
acquiring a local control channel on the single selected RF channel if the local system is acquired.

49. The non-transitory processor-readable storage medium of claim 48, wherein the storage medium has stored thereon processor-executable instructions configured to cause a processor to perform operations further comprising initiating a local system acquisition procedure if the local system is not acquired.

50. The non-transitory processor-readable storage medium of claim 49, wherein the storage medium has stored thereon processor-executable instructions configured to cause a processor to perform operations further comprising initiating the local system acquisition procedure to acquire the local system on the single selected RF channel based on a local system acquisition retry schedule.

51. The non-transitory processor-readable storage medium of claim 49, wherein the storage medium has stored thereon processor-executable instructions configured to cause a processor to perform operations further comprising:
- identifying a local selected RF channel to be a last best RF channel from the local acquisition RF list if signal strength for the last best RF channel is above a local signal detection threshold;
- identifying a local selected RF channel to be an RF channel from the local acquisition RF list with the strongest signal strength if signal strength of the last best RF channel is equal to or below the local signal detection threshold;
- attempting to acquire the local system on the local selected RF channel;
- removing the local selected RF channel from local acquisition RF list if the local system is not acquired on the local selected RF channel; and
- repeating said operations of identifying the local selected RF channel, attempting to acquiring the local system, and removing the local selected RF channel until the local system is acquired on the local selected RF channel or a local system acquisition timeout occurs.

52. The non-transitory processor-readable storage medium of claim 51, wherein the storage medium has stored thereon processor-executable instructions configured to cause a processor to perform operations further comprising obtaining the local acquisition RF list from at least one of a pre-provisioned RF list and a neighbor RF list determined from neighbor description information.

53. The non-transitory processor-readable storage medium of claim 51, wherein the storage medium has stored thereon processor-executable instructions configured to cause a processor to perform operations further comprising initiating a local system acquisition outer loop if the local system is not acquired.

54. The non-transitory processor-readable storage medium of claim 44, wherein the storage medium has stored thereon processor-executable instructions configured to cause a processor to perform operations further comprising initiating a system acquisition outer loop if the wide system is not acquired.

55. An integrated circuit configured for service acquisition in a multi-frequency network, the integrated circuit comprising:
- a first module configured to detect a service acquisition trigger event;
- a second module configured to identify a single selected RF channel from an acquisition RF list based on signal strength, wherein the acquisition RF list identifies RF channels in one or more local operations infrastructures (LOIs) of the multi-frequency network;
- a third module configured to attempt to acquire a wide system on the single selected RF channel;
- a fourth module configured to remove the single selected RF channel from the acquisition RF list if the wide system can not be acquired on the single selected RF channel; and
- a fifth module configured to repeat said operations of identifying, attempting, and removing until the wide system is acquired on the single selected RF channel or a system acquisition timeout occurs.

56. The integrated circuit of claim 55, further comprising a sixth module configured to obtain the acquisition RF list from at least one of a pre-provisioned RF list and a neighbor RF list determined from neighbor description information.

57. The integrated circuit of claim 55, wherein said first module is configured to detect the service acquisition trigger event based on at least one of: a power-up condition; detection of system loss; a content acquisition request; and a scheduled system acquisition attempt.

58. The integrated circuit of claim 55, wherein said fifth module is configured to repeat said operations of identifying, attempting, and removing for RF channels in the acquisition RF list for which signal strength is above a signal detection threshold.

59. The integrated circuit of claim 55, further comprising:
- a sixth module configured to attempt to acquire a local system on the single selected RF channel; and
- a seventh module configured to acquire a local control channel on the single selected RF channel if the local system is acquired.

60. The integrated circuit of claim 59, further comprising an eighth module configured to initiate a local system acquisition procedure if the local system is not acquired.

61. The integrated circuit of claim 60, wherein said eighth module is configured to initiate the local system acquisition procedure to acquire the local system on the single selected RF channel based on a local system acquisition retry schedule.

62. The integrated circuit of claim 60, wherein said eighth module is configured to:
- identify a local selected RF channel to be a last best RF channel from the local acquisition RF list if signal strength for the last best RF channel is above a local signal detection threshold;
- identify a local selected RF channel to be an RF channel from the local acquisition RF list with the strongest signal strength if signal strength of the last best RF channel is equal to or below the local signal detection threshold;
- attempt to acquire the local system on the local selected RF channel;
- remove the local selected RF channel from local acquisition RF list if the local system is not acquired on the local selected RF channel; and
- repeat said operations of identifying the local selected RF channel, attempting to acquire the local system, and removing the local selected RF channel until the local system is acquired on the local selected RF channel or a local system acquisition timeout occurs.

63. The integrated circuit of claim 62, further comprising a ninth module configured to obtain the local acquisition RF list from at least one of a pre-provisioned RF list and a neighbor RF list determined from neighbor description information.

64. The integrated circuit of claim 62, further comprising a ninth module configured to initiate a local system acquisition outer loop if the local system is not acquired.

65. The integrated circuit of claim 55, further comprising a sixth module configured to initiate a system acquisition outer loop if the wide system is not acquired.

* * * * *